US007046351B2

(12) United States Patent
Ito

(10) Patent No.: US 7,046,351 B2
(45) Date of Patent: May 16, 2006

(54) METHOD AND APPARATUS FOR MEASURING ECCENTRICITY OF OPTICAL LENS, AND METHOD AND APPARATUS FOR CENTERING AND EDGING OPTICAL LENS

(75) Inventor: Takayuki Ito, Saitama (JP)

(73) Assignee: PENTAX Corporation, Tokyo (JP)

( * ) Notice: Subject to any disclaimer, the term of this patent is extended or adjusted under 35 U.S.C. 154(b) by 373 days.

(21) Appl. No.: 10/440,122

(22) Filed: May 19, 2003

(65) Prior Publication Data

US 2003/0214646 A1   Nov. 20, 2003

(30) Foreign Application Priority Data

May 20, 2002   (JP)   ............................. 2002-145014
Jan. 23, 2003   (JP)   ............................. 2003-014894

(51) Int. Cl.
   *G01B 9/00*   (2006.01)
(52) U.S. Cl. ....................................................... 356/127
(58) Field of Classification Search ......... 356/124–127
   See application file for complete search history.

(56) References Cited

U.S. PATENT DOCUMENTS 5,548,396 A  *  8/1996  Morita et al. ............... 356/127
5,844,670 A  *  12/1998  Morita et al. ............... 356/124

FOREIGN PATENT DOCUMENTS

| JP | 6-258182 | | 9/1994 |
|---|---|---|---|
| JP | 406273268 A | * | 9/1994 |
| JP | 07159283 A | * | 6/1995 |
| JP | 7-229812 | | 8/1995 |

* cited by examiner

*Primary Examiner*—Hoa Q. Pham
(74) *Attorney, Agent, or Firm*—Greenblum & Bernstein, P.L.C.

(57) ABSTRACT

An apparatus for measuring eccentricity of an optical lens includes a rotary lens holder which supports a first lens surface of an optical lens by vacuum aspiration; a first determining device for determining whether a curvature center of a central portion of the first lens surface is positioned on the rotational axis; a second determining device for determining whether a curvature center of a peripheral portion of the first lens surface is positioned on the rotational axis; and an eccentricity detection device which detects an eccentricity of the optical lens with respect to the rotational axis to calculate an eccentricity of a vertex of the first lens surface with respect to the radial center of the optical lens, including a detector contacts a rim of the optical lens to detect the eccentricity of the optical lens with respect to the rotational axis.

17 Claims, 10 Drawing Sheets

METHOD AND APPARATUS FOR MEASURING ECCENTRICITY OF OPTICAL LENS, AND METHOD AND APPARATUS FOR CENTERING AND EDGING OPTICAL LENS

BACKGROUND OF THE INVENTION

1. Field of the Invention

The present invention relates to a method and an apparatus for measuring an eccentricity of the vertex of an aspherical surface of an aspherical lens (at least one lens surface of which is formed as an aspherical surface) with respect to the radial center of the aspherical lens, an eccentricity of the curvature center of the other lens surface thereof (an aspherical lens surface or a spherical lens surface), and the degree of deviation of the other lens surface. The present invention also relates to a method and an apparatus for centering and edging an optical lens (at least one lens surface of which is formed as an aspherical surface) while reducing an eccentricity of the vertex of an aspherical surface of the optical lens with respect to the true aspherical-surface axis of the aspherical lens surface of the optical lens even if the optical lens is a tilted aspherical lens.

2. Description of the Related Art

In an aspherical lens, at least one lens surface of which is formed as an aspherical surface, if an eccentricity of the vertex of the aspherical surface (the point of intersection of the aspherical surface with the aspherical-surface axis thereof that linearly extends to trace the respective curvature centers of the aspherical surface at different points thereon) with respect to the radial center of the aspherical lens can be measured, i.e., if the radial distance of the vertex of the aspherical surface from the radial center of the aspherical lens can be measured, the influence of the eccentricity of the vertex of the aspherical surface with respect to the radial center of the aspherical lens on the optical performance of the aspherical lens can be observed by studying the correlation between the eccentricity and the optical performance of the aspherical lens.

However, in the prior art, uncertainty about the reference for measurement of the eccentricity remains because the aspherical-surface axis of the aspherical surface is conventionally determined from the curvature center of a given portion of the aspherical surface. For instance, in an aspherical lens having an aspherical surface, the curvature center of which varies greatly between inner and outer portions of the aspherical surface, no conventional methods or apparatuses for precisely measuring an eccentricity of the vertex of the aspherical surface with respect to the radial center of the aspherical lens are known in the art.

In an aspherical lens, at least one lens surface of which is formed as an aspherical surface, if the degree of deviation of the aspherical surface from a spherical surface is large, it is often the case that the degree of eccentricity of the vertex of the aspherical surface with respect to the radial center of the aspherical lens deteriorates the aberration of the whole lens system, more than the degree of tilting of the aspherical-surface axis of the aspherical surface with respect to the radial center of the aspherical lens does, in the case where the aspherical lens is installed in the vicinity of a diaphragm in the lens system.

However, uncertainty about the reference for machining the aspherical lens remains because the aspherical-surface axis of the aspherical surface is conventionally determined from the center of curvature of a given part of the aspherical surface. For instance, in an aspherical lens having an aspherical surface, the curvature center of which varies greatly between inner and outer portions of the aspherical surface, no methods or apparatuses for centering and edging the aspherical lens, so that an eccentricity of the vertex of the aspherical surface with respect to the radial center of the aspherical lens becomes small, are known in the art.

Moreover, no methods or apparatuses for centering and edging a tilted aspherical lens so that an eccentricity of the vertex of the aspherical surface with respect to the radial center of the aspherical lens becomes small are known in the art. Note that a tilted aspherical lens refers to an aspherical lens designed so that the curvature center of the spherical surface on the other lens surface is not positioned on the aspherical-surface axis of the aspherical surface if one and the other lens surfaces of the aspherical lens are a spherical surface and an aspherical surface, respectively, or the optical axes of both lens surfaces are inclined to each other if each of one and the other lens surfaces of the aspherical lens is formed as an aspherical surface.

SUMMARY OF THE INVENTION

The present invention provides a method and an apparatus for measuring an eccentricity of the vertex of an aspherical surface of an aspherical lens with respect to the radial center of the aspherical lens, an eccentricity of the curvature center of the other lens surface (an aspherical lens surface or a spherical lens surface), and the degree of deviation of the other lens surface with a higher degree of precision. The present invention further provides a method and an apparatus for centering and edging an optical lens, at least one lens surface of which is formed as an aspherical surface, while reducing an eccentricity of the vertex of an aspherical surface of the optical lens with respect to the true aspherical-surface axis of the aspherical lens surface of the optical lens even if the optical lens is a tilted aspherical lens.

According to an aspect of the present invention, an apparatus for measuring eccentricity of an optical lens, including a rotary lens holder which rotates about a rotational axis thereof while supporting a first lens surface of an optical lens by vacuum aspiration; a first determining device for determining whether a curvature center of a central portion of the first lens surface is positioned on the rotational axis of the rotary lens holder; a second determining device for determining whether a curvature center of a peripheral portion of the first lens surface is positioned on the rotational axis of the rotary lens holder; and an eccentricity detection device which detects an eccentricity of the optical lens with respect to the rotational axis of the rotary lens holder to calculate an eccentricity of a vertex of the first lens surface with respect to the radial center of the optical lens, the eccentricity detection device including a detector having a contact which comes in contact with a rim of the optical lens to detect the eccentricity of the optical lens with respect to the rotational axis of the rotary lens holder.

It is desirable for the detection of the eccentricity of the optical lens, with the contact of the eccentricity detection device in contact with the rim of the optical lens, to be performed upon achieving a state wherein the first determining device determines that the curvature center of the central portion of the first lens surface is positioned on the rotational axis of the rotary lens holder and upon achieving a state wherein the second determining device determines that the curvature center of the peripheral portion of the first lens surface is positioned on the rotational axis of the rotary lens holder.

It is desirable for the second determining device to include a second detector for detecting the degree of deviation of the peripheral portion of the first lens surface with respect to the rotational axis of the rotary lens holder, the second detector including a second contact which comes in contact with the peripheral portion of the first lens surface to detect the degree of deviation of the peripheral portion of the first lens surface.

It is desirable for the first determining device to include an adjustment phototransmitter which projects light to be incident on the central portion of the first lens surface; and a first light-receiving and determining device which receives incident light thereon, the incident light being projected from the adjustment phototransmitter to be vertically incident on the central portion of the first lens surface and vertically reflected by the central portion of the first lens surface, to determine whether the curvature center of the central portion of the first lens surface is positioned on the rotational axis of the rotary lens holder from an incident position of the received incident light on a light receiving surface of the first light-receiving and determining device.

It is desirable for the second determining device to include a third detector for detecting the degree of deviation of the central portion of the first lens surface with respect to the rotational axis of the rotary lens holder, the third detector including a third contact which comes in contact with the central portion of the first lens surface to detect the degree of deviation of the central portion of the first lens surface; a confirmation phototransmitter which projects light to be incident on the central portion of the first lens surface; and a second light-receiving and determining device which receives incident light thereon, which is projected from the confirmation phototransmitter to be vertically incident on the central portion of the first lens surface to be vertically reflected by the central portion of the first lens surface, to determine whether the curvature center of the central portion of the first lens surface is positioned on the rotational axis of the rotary lens holder from an incident position of the received incident light on a light receiving surface of the second light-receiving and determining device.

It is desirable for the eccentricity measuring apparatus to include a measurement phototransmitter which projects light to be incident on a second lens surface of the optical lens; a light-receiving device which receives incident light thereon that is projected from the measurement phototransmitter to be vertically incident on the second lens surface to be vertically reflected by the second lens surface, wherein the light-receiving device can sense an incident position of the received incident light on a light receiving surface of the light-receiving device; and a processor for determining whether the curvature center of the second lens surface is positioned on the rotational axis of the rotary lens holder from an incident position of the incident light received by the light-receiving device on the light receiving surface thereof to measure an eccentricity of the curvature center of the second lens surface with respect to the rotational axis of the rotary lens holder.

It is desirable for the eccentricity measuring apparatus to include a measurement phototransmitter which projects light to be incident on a central portion of a second lens surface of the optical lens; a light-receiving device which receives incident light thereon that is projected from the measurement phototransmitter to be firstly vertically incident on a central portion of the second lens surface and to be subsequently vertically reflected by the central portion of the second lens surface to be incident on the light-receiving device, wherein the light-receiving device can sense an incident position of the received incident light on a light receiving surface of the light-receiving device; a processor for determining whether the curvature center of the central portion of the second lens surface is positioned on the rotational axis of the rotary lens holder from an incident position of the incident light received by the light-receiving device on the light receiving surface thereof to measure an eccentricity of the curvature center of the second lens surface with respect to the rotational axis of the rotary lens holder; and a fourth detector for detecting the degree of deviation of a peripheral portion of the second lens surface with respect to the rotational axis of the rotary lens holder, the fourth detector including a fourth contact which comes in contact with the peripheral portion of the second lens surface to detect the degree of deviation of the peripheral portion of the second lens surface.

In another embodiment, an apparatus for centering and edging an optical lens having the eccentricity measuring apparatus is provided, including a rotary lens holder which rotates about a rotational axis thereof while supporting a first lens surface of an optical lens by vacuum aspiration, a first determining device for determining whether a curvature center of a central portion of the first lens surface is positioned on the rotational axis of the rotary lens holder, a second determining device for determining whether a curvature center of a peripheral portion of the first lens surface is positioned on the rotational axis of the rotary lens holder, a fixing device for firmly fixing the optical lens to the rotary lens holder; and a grinding device for grinding the rim of the optical lens, wherein the grinding device is movable between a first position where the grinding device is in contact with the rim of the optical lens and a second position where the grinding device is not in contact with the rim of the optical lens.

In another embodiment, a method for measuring eccentricity of an optical lens with an eccentricity detection device is provided, including (a) rotating an optical lens, having a first lens surface and a second lens surface, about a rotational axis of a rotary lens holder while supporting the first lens surface; (b) determining whether a curvature center of a central portion of the first lens surface is positioned on the rotational axis of the rotary lens holder; (c) determining whether a curvature center of a peripheral portion of the first lens surface is positioned on the rotational axis of the rotary lens holder; (d) adjusting a position of the optical lens with respect to the rotary lens holder so that the curvature center of the central portion and the curvature center of the peripheral portion are positioned on the rotational axis of the rotary lens holder; and (e) detecting an eccentricity of the optical lens with respect to the rotational axis of the rotary lens holder, in state wherein the curvature centers of the central portion and the peripheral portion of the first lens surface are positioned on the rotational axis of the rotary lens holder, to calculate an eccentricity of a vertex of the first lens surface with respect to the radial center of the optical lens, the eccentricity detection device including a contact which comes in contact with a rim of the optical lens to detect the eccentricity of the optical lens with respect to the rotational axis of the rotary lens holder.

It is desirable for step (c) to include a step of making a first contact sensor come in contact with the peripheral portion of the first lens surface to detect an amount of deviation of the peripheral portion of the first lens surface.

It is desirable for step (b) to include a step of making a second contact sensor come in contact with the central portion of the first lens surface to detect an amount of deviation of the central portion of the first lens surface.

It is desirable for step (b) to include (b1) projecting light to be incident on the central portion of the first lens surface;

and (b2) making a first light-receiving and determining device receive incident light which is projected in step (b1) to be vertically incident on the central portion of the first lens surface and to be vertically reflected by the central portion of the first lens surface, the first light-receiving and determining device determining whether the curvature center of the central portion of the first lens surface is positioned on the rotational axis of the rotary lens holder from an incident position of the received incident light on a light receiving surface of the first light-receiving and determining device.

It is desirable for step (b) to include (b3) making a second detector come in contact with the central portion of the first lens surface to detect the degree of deviation of the central portion of the first lens surface; and (b4) making a first light-receiving and determining device receive incident light which is projected from a phototransmitter to be vertically incident on the central portion of the first lens surface and to be vertically reflected by the central portion of the first lens surface, the first light-receiving and determining device determining whether the curvature center of the central portion of the first lens surface is positioned on the rotational axis of the rotary lens holder from an incident position of the received incident light on a light receiving surface of the first light-receiving and determining device, step (b4) being performed after step (d).

It is desirable for the eccentricity measuring method to include (f) projecting light to be vertically incident on a second lens surface of the optical lens after performing step (d); (g) receiving incident light which is vertically reflected by the second lens surface; and (h) determining an eccentricity of the curvature center of the second lens surface with respect to the rotational axis of the rotary lens holder.

It is desirable for the eccentricity measuring method to include (f) projecting light to be vertically incident on a central portion of the second lens surface of the optical lens after performing step (d); (g) receiving incident light which is vertically reflected by the central portion of the second lens surface; and (h) determining an eccentricity of the curvature center of the central portion of the second lens surface with respect to the rotational axis of the rotary lens holder.

It is desirable for at least the first lens surface of the optical lens, which is supported by the rotary lens holder, to be formed as an aspherical surface.

In another embodiment, a method for centering and edging an optical lens having the above eccentricity measuring apparatus is provided, including determining whether a curvature center of a central portion of said first lens surface is positioned on said rotational axis of said rotary lens holder; determining whether a curvature center of a peripheral portion of said first lens surface is positioned on said rotational axis of said rotary lens holder; adjusting a position of said optical lens with respect to said rotary lens holder so that said curvature center of said central portion and said curvature center of said peripheral portion are positioned on said rotational axis of said rotary lens holder; firmly fixing the optical lens to the rotary lens holder after determining that the curvature center of the central portion and the curvature center of the peripheral portion are positioned on the rotational axis of the rotary lens holder; and bringing a grinding device into contact with the rim of the optical lens while rotating the optical lens to grind the rim of the optical lens to thereby remove the eccentricity of the optical lens, wherein the grinding device is movable between a first position where the grinding device is in contact with the rim of the optical lens and a second position where the grinding device is not in contact with the rim of the optical lens.

In another embodiment an apparatus for measuring eccentricity of an optical lens is provided, including a rotary lens holder which rotates about a rotational axis and supports a first lens surface of an optical lens by vacuum aspiration so that an aspherical-surface axis of the optical lens substantially coincides with the rotational axis; a first contact sensor which comes in contact with a central portion of the first lens surface; a second contact sensor which comes in contact with a peripheral portion of the first lens surface; a third contact sensor which comes in contact with a rim of the first lens surface; and a processor for determining whether a curvature center of the central portion of the first lens surface is positioned on the rotational axis from a signal output from the first contact sensor, for determining whether a curvature center of the peripheral portion of the first lens surface is positioned on the rotational axis from a signal output from the second contact sensor, and for determining an eccentricity of the rim of the optical lens with respect to the rotational axis of the rotary lens holder from a signal output from the third contact sensor to calculate an eccentricity of a vertex of the first lens surface with respect to the radial center of the optical lens.

In another embodiment, a method for measuring eccentricity of an optical lens is provided, including rotating a lens holder which supports an optical lens about a rotational axis, the lens holder supporting a first lens surface of the optical lens by vacuum aspiration so that an aspherical-surface axis of the optical lens substantially coincides with the rotational axis; making a first contact sensor come in contact with a central portion of the first lens surface; making a second contact sensor come in contact with a peripheral portion of the first lens surface; making a third contact sensor come in contact with a rim of the optical lens; determining whether a curvature center of the central portion of the first lens surface is positioned on the rotational axis from a signal output from the first contact sensor; determining whether a curvature center of the peripheral portion of the first lens surface is positioned on the rotational axis from a signal output from the second contact sensor; and determining an eccentricity of the rim of the optical lens with respect to the rotational axis of the rotary lens holder from a signal output from the third contact sensor to calculate an eccentricity of a vertex of the first lens surface with respect to the radial center of the optical lens.

The present disclosure relates to subject matter contained in Japanese Patent Applications Nos.2002-145014 (filed on May 20, 2002) and 2003-14894 (filed on Jan. 23, 2003) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

The first embodiment of the apparatus for measuring an eccentricity of an optical lens according to the present invention will be hereinafter discussed with reference to FIG. 1.

Figure 1:
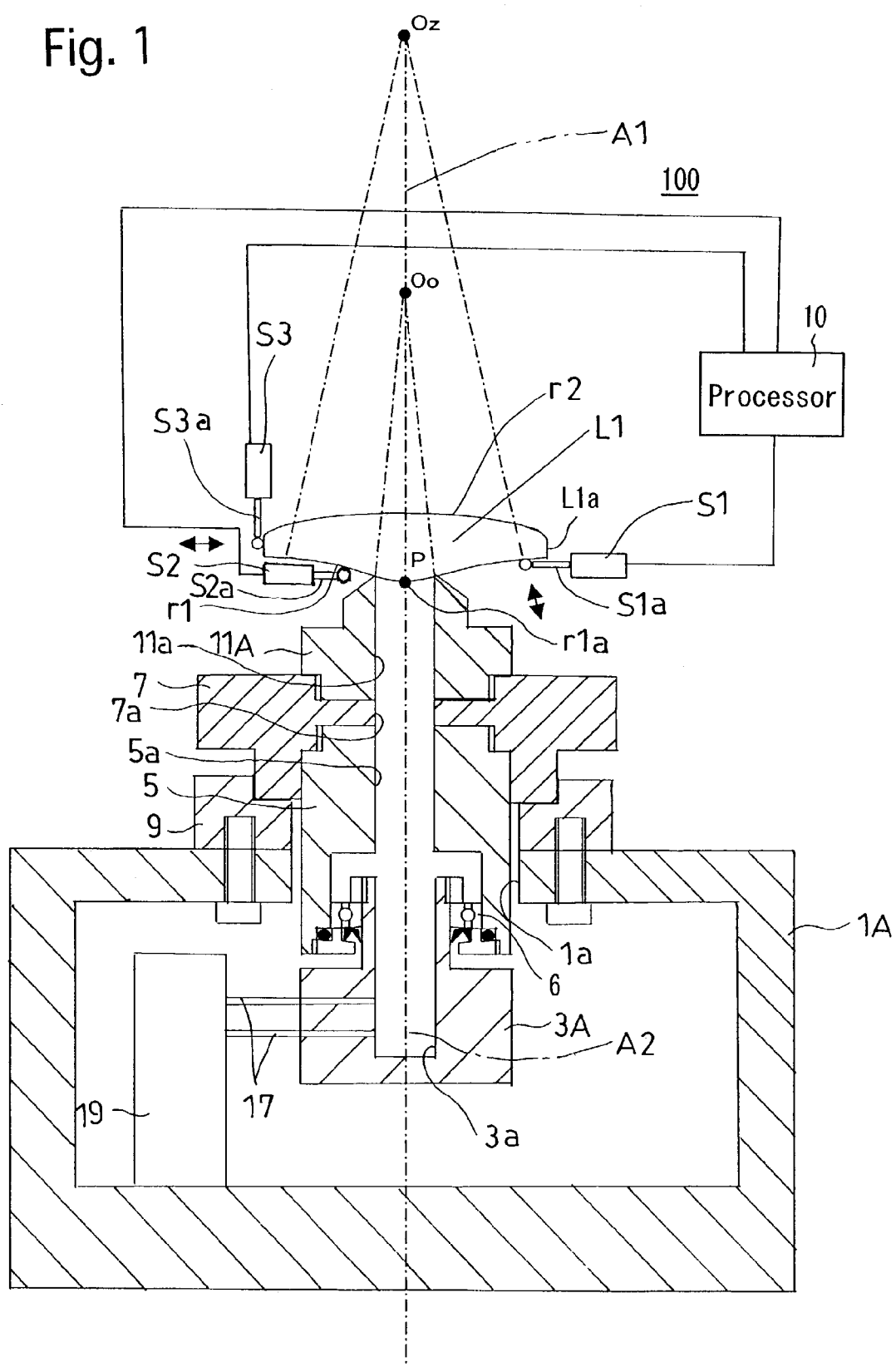
FIG. 1 is a cross sectional view of a first embodiment of an apparatus for measuring an eccentricity of an optical lens according to the present invention.

The eccentricity measuring apparatus 100 shown in FIG. 1 is used to measure an eccentricity of an aspherical lens (optical lens) L1 which is provided on one and the other lens surfaces thereof with an aspherical surface r1 and a spherical surface r2, respectively. More specifically, the eccentricity measuring apparatus 100 is used to measure an eccentricity of the vertex of the aspherical surface r1 with respect to the radial center of the aspherical lens L1. This eccentricity is hereinafter referred to as an "eccentricity of the aspherical surface r1", and is defined herein as a distance of a vertex r1a of the aspherical surface r1 (the point of intersection of the aspherical surface r1 with an aspherical-surface axis A1 thereof that linearly extends to trace a curvature center Oo of a central portion of the aspherical surface r1 and a curvature center Oz of a peripheral portion of the aspherical surface r1) from the radial center of the aspherical lens L1 in a radial direction of the aspherical lens L1.

The structure of the eccentricity measuring apparatus 100 will be discussed hereinafter.

The eccentricity measuring apparatus 100 is provided at the bottom thereof with a base 1A having a mounting hole 1a on top of the base 1A. The eccentricity measuring apparatus 100 is provided in the base 1A with a fixing member 3A. The fixing member 3A has a closed bottom, and is provided with a circular axial hole 3a having an open end at the top of the fixing member 3A. The axis of the axial hole 3a extends in a vertical direction of the eccentricity measuring apparatus 100. The eccentricity measuring apparatus 100 is provided above the fixing member 3A with a first rotatable member 5 having a substantially cylindrical shape. The first rotatable member 5 is connected to a motor (not shown), and is coaxially fitted on the fixing member 3A via a bearing 6 to be rotatable about a vertical axis. An upper portion of the first rotatable member 5 projects upwards from the base 1A through the mounting hole 1a. The first rotatable member 5 is provided with a circular axial hole 5a which is coaxially communicatively connected with the central hole 3a of the fixing member 3A. The eccentricity measuring apparatus 100 is provided on the first rotatable member 5 with a second rotatable member 7 formed as an annular member and fixed to the first rotatable member 5. The second rotatable member 7 is provided with a circular axial hole 7a which is coaxially communicatively connected with the axial hole 5a of the first rotatable member 5. The eccentricity measuring apparatus 100 is provided between the base 1A and the second rotatable member 7 with an annular fixing member 9 fixed to a top surface of the base 1A by set screws. An annular bottom surface of the second rotatable member 7 is mounted on the annular fixing member 9 to be supported thereby and to be freely rotatable on the annular fixing member 9 about the axis thereof which is coaxial with the axis of the first rotatable member 5.

The eccentricity measuring apparatus 100 is provided on the second rotatable member 7 with a lens holder (rotary lens holder) 11A. The lens holder 11A is provided on top thereof with a suction opening for supporting a central portion of the aspherical surface r1 of the aspherical lens L1 as shown in FIG. 1. The lens holder 11A is provided therein with a circular axial hole 11a having the aforementioned suction opening at the upper end of the axial hole 11a. The axial hole 11a is coaxially communicatively connected with the axial hole 7a of the second rotatable member 7. The diameters of the axial holes 3a, 5a, 7a and 11a are substantially the same.

The eccentricity measuring apparatus 100 is provided in the base 1a with a vacuum suction machine 19 fixed to a top surface of the bottom plate of the base 1A. The vacuum suction machine 19 is connected to the axial hole 3a of the fixing member 3A via suction pipes 17. When the vacuum suction machine 19 operates with the aspherical lens L1 being placed on the lens holder 11A, the air in the axial holes 3a, 5a, 7a and 11a is sucked by the vacuum suction machine 19 via the suction pipe 17, so that the aspherical lens L1 is tightly fixed to the suction opening of the lens holder 11A by vacuum aspiration.

The eccentricity measuring apparatus 100 is provided above the lens holder 11A with a first contact sensor (detector) S1, a second contact sensor (detector) S2 and a third contact sensor (detector) S3. The first contact sensor S1 serves as a fundamental element of a first determining device for determining whether the curvature center Oz of the peripheral portion of the first lens surface r1 is positioned on a rotational axis of the lens holder 11A. The second contact sensor S2 serves as a fundamental element of a second determining device for determining whether the curvature center Oo of the central portion of the first lens surface r1 is positioned on the rotational axis of the lens holder 11A. The third contact sensor S3 serves as a fundamental element of an eccentricity detection device for detecting the eccentricity of the optical lens L1 with respect to the rotational axis of the lens holder 11A to calculate the eccentricity the first lens surface r1. The three contact sensors S1, S2 and S3 are provided with swingable contacts S1a, S2a and S3a, respectively, each of which comes in contact with the aspherical lens L1. Specifically, the tip of the swingable contact S1a of the first contact sensor S1 comes in contact with a peripheral portion of the aspherical surface r1, the tip of the swingable contact S2a of the second contact sensor S2 comes in contact with a central portion of the aspherical surface r1, and the tip of the swingable contact S3a of the third contact sensor S3 comes in contact with the rim L1a of the aspherical lens L1. The three sensors S1, S2 and S3 are each connected to a processor 10 and constitute the first determining device, the second determining device and the eccentricity detection device, respectively. The processor 10 is connected to a TV monitor (not shown).

A method for measuring the eccentricity of the aspherical surface r1 with the eccentricity measuring apparatus 100 will be discussed hereinafter.

Firstly, the aspherical lens L1, which is formed to have the aspherical surface r1 with a high degree of precision, is put on the top of the lens holder 11A with the aspherical surface r1 covering the suction opening of the lens holder 11A. Subsequently, the vacuum suction machine 19 is actuated to produce a vacuum in the axial holes 3a, 5a, 7a and 11a so that the aspherical surface r1 of the aspherical lens L1 is drawn to the suction opening of the lens holder 11A by vacuum aspiration. In this state, the aforementioned motor that is connected to the first rotatable member 5 is activated to rotate the first rotatable member 5, the second rotatable member 7, the lens holder 11A and the aspherical lens L1 about a common axis A2 of the central holes 3a, 5a, 7a and 11a, i.e., about the rotational axis of the lens holder 11A.

During this rotation of the aspherical lens L1, if the curvature center Oo of the central portion of the aspherical surface r1 and the curvature center Oz of the peripheral portion of the aspherical surface r1 are not positioned on the axis A2, each of the swingable contacts S1a and S2a of the first and second contact sensors S1 and S2 oscillates in a vertical direction. The processor inputs signals output from the first and second contact sensors S1 and S2 to calculate the amplitude of the swingable contact S1a (the amount of deviation of the peripheral portion of the aspherical surface r1) and the amplitude of the swingable contact S2a (the amount of deviation of the central portion of the aspherical surface r1), and indicates these two calculated amplitudes on the TV monitor.

The position of the aspherical lens L1 with respect to the lens holder 11A is adjusted so that each of the calculated amplitudes of the swingable contacts S1a and S2a becomes zero. When each calculated amplitude becomes zero, the aspherical lens L1 is tightly fixed to the suction opening of the lens holder 11A by vacuum aspiration so that the position thereof with respect to the lens holder 11A does not change. This adjustment of the position of the aspherical lens L1 with respect to the lens holder 11A brings each of the curvature centers Oo and Oz onto the axis A2, which makes the aspherical-surface axis A1 of the aspherical surface r1 coincident with the axis A2 of the central holes 3a, 5a, 7a and 11a. Note that the above mentioned state where each of the calculated amplitudes of the swingable contacts S1a and S2a is zero means either a state where each of the two contacts S1a and S2a does not move or a state where the swingable contact S1a of the first contact sensor S1 slightly oscillates within a predetermined tolerance. The same method can be said in each of the following second through sixth embodiments.

Once the aspherical-surface axis A1 coincides with the axis A2, the eccentricity of the aspherical surface r1 which is calculated by the processor 10 from the calculated amplitude of the swingable contact S3a of the third contact sensor S3 is visually checked on the TV monitor.

The eccentricity of the aspherical surface r1 is calculated on each of many aspherical lenses L1 in the same manner to determine the optical performance of each aspherical lens L1 with an associated master lens (not shown), and the influence of the eccentricity of the aspherical surface r1 upon the optical performance of the aspherical lens L1 can be determined by studying the correlation between the optical performance of the aspherical lens and the eccentricity of the aspherical surface r1.

The second embodiment of the apparatus for measuring an eccentricity of an optical lens according to the present invention will be hereinafter discussed with reference to FIG. 2. In the second embodiment of the eccentricity measuring apparatus, elements and parts similar to those in the first embodiment of the eccentricity measuring apparatus are designated by the same reference numerals, and will not be hereinafter discussed for the sake of simplicity.

Similar to the first embodiment shown in FIG. 1, the second embodiment of an eccentricity measuring apparatus 200 is used to measure the eccentricity of the aspherical surface r1 of the aspherical lens L1, which is provided on one and the other lens surfaces thereof with the aspherical surface r1 and the spherical surface r2, respectively.

Only elements and parts unique to the second embodiment of the eccentricity measuring apparatus 200, which are not incorporated in the first embodiment of the eccentricity measuring apparatus 100, will be hereinafter discussed.

The eccentricity measuring apparatus 200 is provided with a base 1B having a greater width than the base 1A of the first embodiment shown in FIG. 1. The base 1B is provided on top thereof with an opening 1b in addition to the mounting hole 1a so that light can come into the base 1B through the opening 1b. The eccentricity measuring apparatus 200 is provided in the base 1B on a top surface of the bottom plate of the base 1B with a pair of total reflection prisms (right-angle prisms) 13 and 15. The total reflection prism 13 is positioned below the mounting hole 1a while the other total reflection prism 15 is positioned below the opening 1b. A glass plate G is provided at the base of a fixing member 3B so as to close off the axial hole 3a in order for a vacuum to be achieved therein. The glass plate G is transparent in order to allow light to pass therethrough, and also has a predetermined thickness so as to have a sufficient strength for when a vacuum is created within the axial hole 3a.

The eccentricity measuring apparatus 200 is provided above the opening 1b with a confirmation phototransmitter 21. The confirmation phototransmitter 21 is provided with a casing 23, a light source 25, a mirror M1, a prism P2, three lenses L2, L3 and L4, and a confirmation sensor 27. The casing 23 is provided on a bottom plate thereof with an opening 23a positioned above the opening 1b of the base 1B. The light source 25, the mirror M1, the prism P2, the three lenses L2, L3 and L4, and the confirmation sensor 27 are positioned in the casing 23. The confirmation sensor 27 is connected to the processor 10.

A method for measuring the eccentricity of the aspherical surface r1 with the eccentricity measuring apparatus 200 will be discussed hereinafter.

Firstly, the aspherical lens L1 is put on the top of the lens holder 11A with the aspherical surface r1 covering the suction opening of the lens holder 11A. Subsequently, the vacuum suction machine 19 is actuated to produce a vacuum in the axial holes 3a, 5a, 7a and 11a so that the aspherical surface r1 of the aspherical lens L1 is drawn to the suction opening of the lens holder 11A by vacuum aspiration. In this state, the aforementioned motor that is connected to the first rotatable member 5 is activated to rotate the aspherical lens L1 about the axis A2. The position of the aspherical lens L1 with respect to the lens holder 11A is adjusted so that each of the calculated amplitudes of the swingable contacts S1a and S2a becomes zero. When each calculated amplitude becomes zero, the aspherical lens L1 is tightly fixed to the suction opening of the lens holder 11A by vacuum aspiration so that the position thereof with respect to the lens holder 11A does not change. This adjustment of the position of the aspherical lens L1 with respect to the lens holder 11A brings each of the curvature centers Oo and Oz onto the axis A2, which makes the aspherical-surface axis A1 of the aspherical surface r1 coincident with the axis A2 of the central holes 3a, 5a, 7a and 11a. The procedures up to this point are the same as those in the first embodiment of the eccentricity measuring apparatus 100.

After each of the calculated amplitudes of the swingable contacts S1a and S2a becomes zero, it is confirmed whether the curvature centers Oo of the central portion of the aspherical surface r1 is positioned on the axis A2 in the following procedure.

Firstly, upon the light source 25 being turned ON, the light emitted from the light source 25 is reflected downwards by the mirror M1. Subsequently, the light passes through the lens L2, the prism P2, the lens L3, the lens L4, is reflected by the total-reflecting prisms 15 and 13, and is vertically incident on a central portion of the aspherical surface r1. Subsequently, the light vertically reflected by the central portion of the aspherical surface r1 proceeds back toward the prism 13 to be reflected by the prisms 13 and 15 to pass through the lenses L4 and L3. The light which is passed through the lenses L4 and L3 in this order is reflected by a beam splitting surface P2a of the prism P2 to be incident on the confirmation sensor 27. The processor 10 determines whether the confirmation sensor 27 receives the incident light on a predetermined reference area on the confirmation sensor 27.

If the confirmation sensor 27 receives the incident light on a predetermined reference area on the confirmation sensor 27, one or more characters or marks indicating that the curvature centers Oo is positioned on the axis A2 are indicated on the TV monitor. If the confirmation sensor 27 receives the incident light outside the predetermined reference area on the confirmation sensor 27, the one or more characters or marks indicating that the curvature centers Oo is not positioned on the axis A2 are indicated on the TV monitor.

When it is confirmed that the curvature centers Oo is positioned on the axis A2 in the above described manner, the eccentricity of the aspherical surface r1, which is calculated by the processor 10 due to movement of the swingable contact S3a of the third contact sensor S3, can be checked on the TV monitor.

Figure 2:
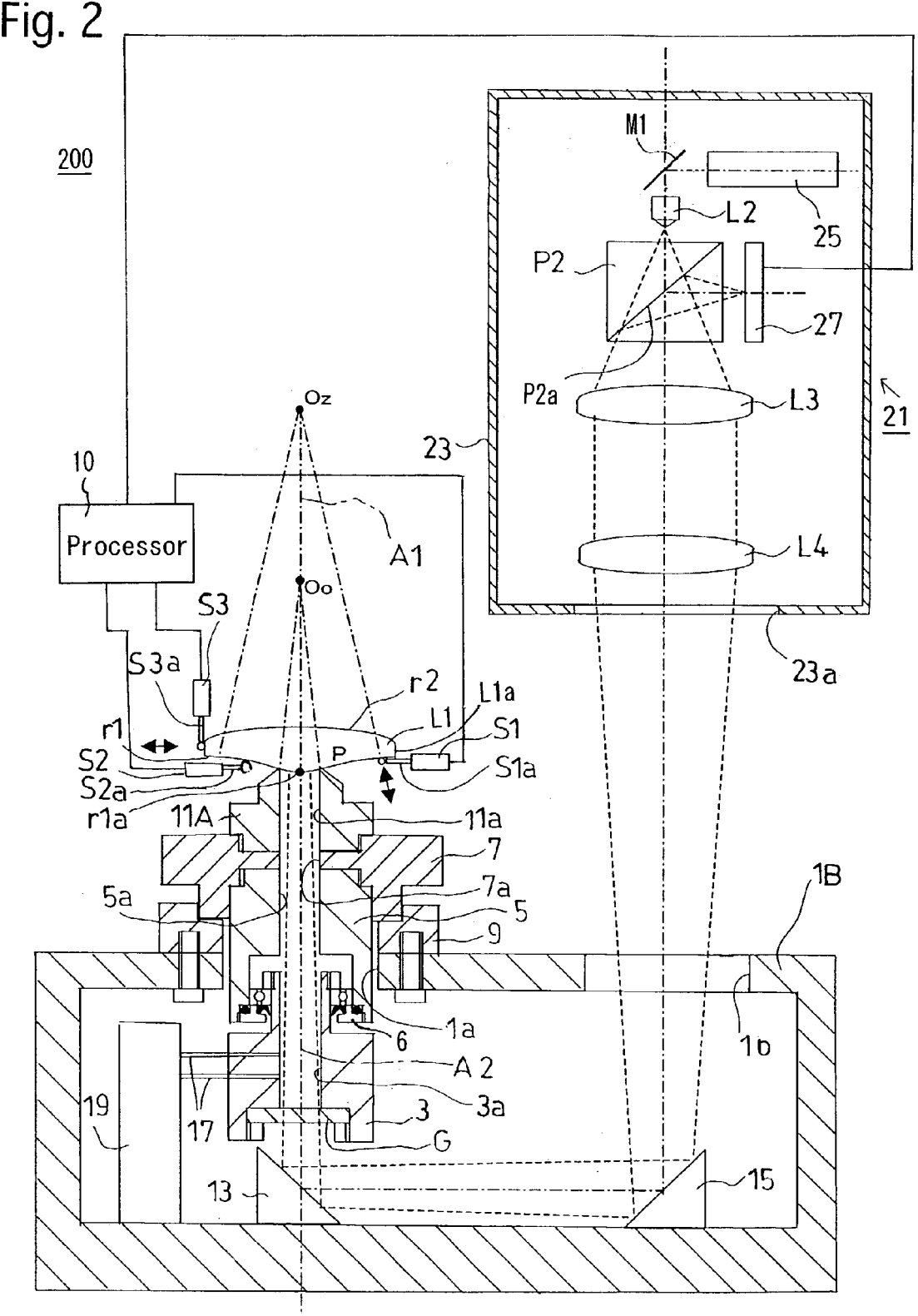
FIG. 2 is a cross sectional view of a second embodiment of the apparatus for measuring an eccentricity of an optical lens according to the present invention.

As can be seen from the above descriptions, according to the second embodiment of the eccentricity measuring apparatus shown in FIG. 2, whether or not the curvature centers Oo is positioned on the axis A2 can visually be checked easily when the eccentricity of the aspherical surface r1 of the aspherical lens L1, which is provided on one and the other lens surfaces thereof with the aspherical surface r1 and the spherical surface r2, respectively, is measured. This makes it possible to measure the eccentricity of the aspherical surface r1 with a higher degree of precision.

The third embodiment of the apparatus for measuring an eccentricity of an optical lens according to the present invention will be hereinafter discussed with reference to FIG. 3. In the third embodiment of the eccentricity measuring apparatus, elements and parts similar to those in the second embodiment of the eccentricity measuring apparatus are designated by the same reference numerals, and will not be hereinafter discussed for the sake of simplicity.

In the third embodiment, an eccentricity measuring apparatus 300 is used to measure the eccentricity of the aspherical surface r1 of the aspherical lens L1, which is provided on one and the other lens surfaces thereof with the aspherical surface r1 and the spherical surface r2, respectively, and an eccentricity of the curvature center Os of the spherical surface r2 with respect to the aspherical-surface axis A1 of the aspherical surface r1. This eccentricity is hereinafter referred to as an "eccentricity of the spherical surface r2", and is defined herein as a distance of the curvature center Os from the aspherical-surface axis A1 in a radial direction of the aspherical lens L1.

Only elements and parts unique to the third embodiment of the eccentricity measuring apparatus 300, which are not incorporated in the second embodiment of the eccentricity measuring apparatus 200, will be hereinafter discussed.

The eccentricity measuring apparatus 300 is provided above the aspherical lens L1 with a measurement phototransmitter 29 for measuring the eccentricity of the spherical surface r2.

The measurement phototransmitter 29 is provided with a casing 31, a mirror M2, a prism P3, three lenses L5, L6 and L7, and a measurement sensor 33. The casing 31 is provided on a bottom plate thereof with an opening 31a positioned above the aspherical lens L1, and is further provided on a side wall of the casing 31 with an opening 31b which faces an opening 23b formed on the casing 31 of the confirmation phototransmitter 21. The mirror M2, the prism P3, the three lenses L5, L6 and L7, and the measurement sensor 33 are positioned in the casing 31. The measurement sensor 33 is connected to the processor 10.

The procedures, performed using the eccentricity measuring apparatus 300, for bringing the aspherical-surface axis A1 of the aspherical surface r1 into coincidence with the axis A2 of the central holes 3a, 5a, 7a and 11a, for confirming that the aspherical-surface axis A1 is coincident with the axis A2, and for measuring the eccentricity of the aspherical surface r1 are the same as those in the second embodiment of the eccentricity measuring apparatus 200.

The procedure for measuring the eccentricity of the spherical surface r2 will be hereinafter discussed.

Firstly, upon the light source 25 being turned ON, a part of the light emitted from the light source 25 passes through a beam splitting surface p1a of the prism P1 and the openings 23b and 31b to enter the casing 31. Subsequently, the light which is passed through the opening 31b is totally reflected downwards by the mirror M2 to pass through the prism P3, the lens L6, the lens L7 to be incident on the spherical surface r2. The light vertically incident on the spherical surface r2 is vertically reflected thereby back toward the lens L7. Subsequently, the light passes through the lenses L7 and L6 to be reflected by a beam splitting surface P3a of the prism P3 to be incident on the measurement sensor 33.

The processor 10 calculates the eccentricity of the spherical surface r2 in accordance with the incident position of the light incident on a light receiving surface of the measurement sensor 33, and indicates the calculated eccentricity on the TV monitor. If the measurement sensor 33 receives the incident light on a predetermined reference area on the light receiving surface of the measurement sensor 33, one or more characters or marks indicating that the eccentricity of the spherical surface r2 is zero are indicated on the TV monitor. If the measurement sensor 33 receives the incident light outside the predetermined reference area on the light receiving surface of the measurement sensor 33, the numerical value of the eccentricity of the spherical surface r2 is indicated on the TV monitor.

The eccentricity of the aspherical surface r1 and the eccentricity of the spherical surface r2 are calculated on each of many aspherical lenses L1 in the same manner to determine the optical performance of each aspherical lens with an associated master lens (not shown), and the influence of the eccentricity of the aspherical surface r1 and the eccentricity of the spherical surface r2 upon the optical performance of the aspherical lens L1 can be determined by studying the correlation between the optical performance of the aspherical lens L1 and the eccentricities of the aspherical surface r1 and the spherical surface r2.

The fourth embodiment of the apparatus for measuring an eccentricity of an optical lens according to the present invention will be hereinafter discussed with reference to FIG. 4. In the fourth embodiment of an eccentricity measuring apparatus 400, elements and parts similar to those in the third embodiment of the eccentricity measuring apparatus are designated by the same reference numerals, and will not be hereinafter discussed for the sake of simplicity.

The fourth embodiment of the eccentricity measuring apparatus 400 is used to measure the eccentricity of the aspherical surface r1 of an aspherical lens (optical lens) L8, which is provided on one and the other lens surfaces thereof with the aspherical surface r1 and an aspherical surface r3, respectively, an eccentricity of a curvature center Os of a central portion of the aspherical surface r3 with respect to the aspherical-surface axis A1 of the aspherical surface r1 (this eccentricity is hereinafter referred to as an "eccentricity of a central portion of the aspherical surface r3"), and the degree of deviation of a peripheral portion of the aspherical surface r3 with respect to the rotational axis of the lens holder 11A. Note that Ot designates the peripheral portion of the aspherical surface r3.

The procedures, performed using the eccentricity measuring apparatus 400, for bringing the aspherical-surface axis A1 of the aspherical surface r1 into coincidence with the axis A2 of the central holes 3a, 5a, 7a and 11a with the use of the first and second contact sensors S1 and S2, for confirming that the aspherical-surface axis A1 is coincident with the axis A2 on the TV monitor, and for measuring the eccentricity of the aspherical surface r1 are identical to those in the third embodiment of the eccentricity measuring apparatus 300. Accordingly, in the following descriptions of the fourth embodiment of the eccentricity measuring apparatus, such procedures identical to those in the third embodiment of the eccentricity measuring apparatus 300 and also elements and parts similar to those in the third embodiment of the eccentricity measuring apparatus will not be hereinafter discussed for the sake of simplicity. Namely, only elements and parts unique to the fourth embodiment of the eccentricity measuring apparatus 400, which are not incorporated in the third embodiment of the eccentricity measuring apparatus 300, will be hereinafter discussed in detail.

The eccentricity measuring apparatus 400 is provided above the first contact sensor S1 with a fourth contact sensor (detector) S4 having a swingable contact S4a. The swingable contact S4a comes in contact with a peripheral portion of the aspherical surface r3 that is formed on the top surface of the aspherical lens L8 as viewed in FIG. 4. The fourth contact sensor S4 is connected to the processor 10.

To measure the eccentricity of the central portion of the aspherical surface r3 of the aspherical lens L8, firstly, the light source 25 is turned ON so that light emitted from the light source 25 is incident on the central portion of the aspherical surface r3 via the mirror M2, the prism P3, and the lenses L6 and L7. Thereafter, the light vertically incident on the aspherical surface r3 is vertically reflected thereby back toward the lens L7 to be incident on the measurement sensor 33 via the lens L7, the lens L6 and the prism P3. If the measurement sensor 33 receives the incident light on a predetermined reference area on the light receiving surface of the measurement sensor 33, one or more characters or marks indicating that the eccentricity of the central portion of the aspherical surface r3 is zero are indicated on the TV monitor. If the measurement sensor 33 receives the incident light outside the predetermined reference area on the light receiving surface of the measurement sensor 33, the numerical value of the eccentricity of the central portion of the aspherical surface r3 is visually checked on the TV monitor. In addition, the degree of deviation of the peripheral portion of the aspherical surface r3 which is calculated from the amplitude of the swingable contact S4a of the fourth contact sensor S4, and is visually checked on the TV monitor.

The eccentricity of the aspherical surface r1, the eccentricity of the central portion of the aspherical surface r3 and the degree of deviation of the peripheral portion of the aspherical surface r3 are calculated on each of many aspherical lenses L8 in the same manner to determine the optical performance of each aspherical lens with an associated master lens (not shown), and the influence of the eccentricity of the aspherical surface r1, the eccentricity of the central portion of the aspherical surface r3 and the degree of deviation of the peripheral portion of the aspherical surface r3 upon the optical performance of the aspherical lens L8 can be determined by studying the correlation between the optical performance of the aspherical lens L8 and the eccentricities of the aspherical surfaces r1 and r3 and the degree of deviation of the peripheral portion of the aspherical surface r3.

The fifth embodiment of the apparatus for measuring an eccentricity of an optical lens according to the present invention will be hereinafter discussed with reference to FIG. 5. In the fifth embodiment of an eccentricity measuring apparatus 500, elements and parts similar to those in the third embodiment of the eccentricity measuring apparatus are designated by the same reference numerals, and will not be hereinafter discussed for the sake of simplicity.

The fifth embodiment of the eccentricity measuring apparatus 500 is used to measure the eccentricity of the aspherical surface r1 of the aspherical lens L1, which is provided on one and the other lens surfaces thereof with the aspherical surface r1 and the spherical surface r2, respectively, and the eccentricity of the spherical surface r2 of the aspherical lens L1 (i.e., the eccentricity of the curvature center Os of the spherical surface r2 with respect to the aspherical-surface axis A1 of the aspherical surface r1).

Figure 3:
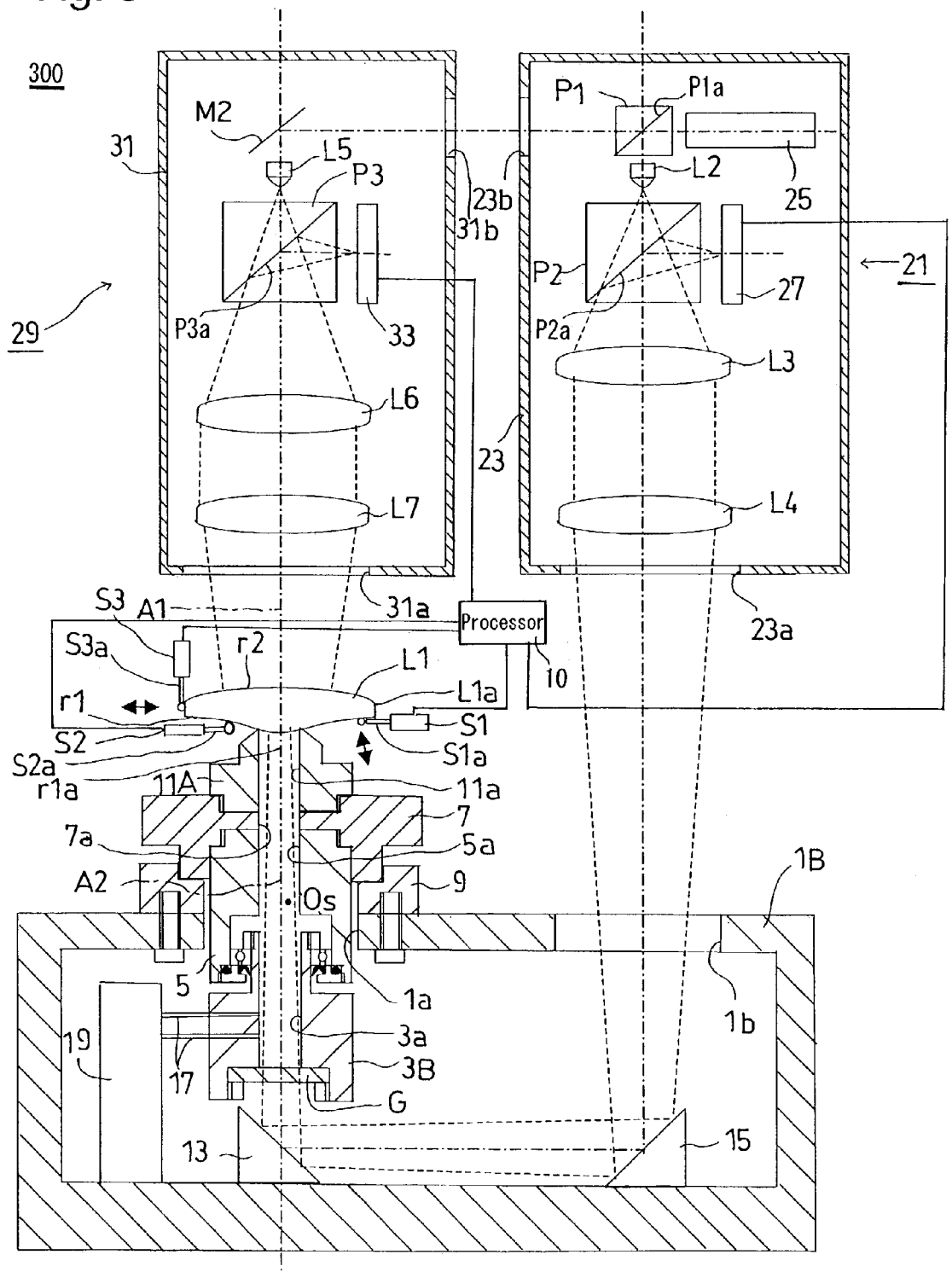
FIG. 3 is a cross sectional view of a third embodiment of the apparatus for measuring an eccentricity of an optical lens according to the present invention.

The eccentricity measuring apparatus 500 is provided on the second rotatable member 7 with a lens holder (rotary lens holder) 11B, which has a different shape from the lens holder 11A shown in FIG. 3. The lens holder 11B is provided on top thereof with a suction opening for supporting and supporting a central portion of the aspherical surface r1 of the aspherical lens. The suction opening of the lens holder 11B is greater in diameter than the suction opening of the lens holder 11A shown in FIG. 3. The lens holder 11B is provided therein with a stepped axial hole 110a having the aforementioned suction opening at the upper end of the axial hole 110a. The diameter of the stepped axial hole 110a increases stepwise in a direction from bottom to top of the lens holder 11B as shown in FIG. 5. The axial hole 110a is coaxially communicatively connected with the axial hole 7a of the second rotatable member 7. The aspherical lens L1 is supported by the lens holder 11B so that a peripheral portion of the aspherical surface r1 which is positioned slightly inside the rim L1a of the aspherical lens L1 is placed on the annular top end of the lens holder 11B.

The eccentricity measuring apparatus 500 is provided above the opening 1b of the base 1B with an adjustment phototransmitter 35 which is substantially the same as the confirmation phototransmitter 21 in structure except that the adjustment phototransmitter 35 is provided with an adjustment sensor 37 instead of the confirmation sensor 27 provided in the confirmation phototransmitter 21. The adjustment sensor 37 is connected to the processor 10, and thereby constitute a first light-receiving and determining device.

The eccentricity measuring apparatus 500 is not provided with the second contact sensor S2 that that of the eccentricity measuring apparatus 300.

The procedure for measuring the eccentricity of the spherical surface r1 will be hereinafter discussed.

Firstly, the aspherical lens L1 is place on the top of the lens holder 11B with the aspherical surface r1 covering the suction opening of the lens holder 11B. Subsequently, the vacuum suction machine 19 is actuated to produce a vacuum in the axial holes 3a, 5a, 7a and 110a so that the aspherical surface r1 of the aspherical lens L1 is drawn to the suction opening of the lens holder 11B by vacuum aspiration. In this state, the aforementioned motor that is connected to the first rotatable member 5 is activated to rotate the first rotatable member 5, the second rotatable member 7, the lens holder 11B and the aspherical lens L1 about the axis A2.

When the light source 25 is turned ON, the light emitted from the light source 25 is partly reflected downwards by the prism P1. Subsequently, the light reflected downwards by the prism P1 passes through the lens L2, the prism P2, the lens L3, the lens L4, is reflected by the total-reflecting prisms 15 and 13 to be vertically incident on a central portion of the aspherical surface r1. Thereafter, the light vertically reflected by the central portion of the aspherical surface r1 proceeds back toward the prism 13 to be reflected by the prisms 13 and 15 and pass through the lenses L4 and L3. The light which is passed through the lenses L4 and L3, in that order, is reflected by a beam splitting surface P2a of the prism P2 to be incident on the adjustment sensor 37.

At this time, the adjustment sensor 37 receives the incident light outside the predetermined reference area on the adjustment sensor 37 if the curvature centers Oo is not positioned on the axis A2, or the adjustment sensor 37 receives the incident light on the predetermined reference area on the adjustment sensor 37 if the curvature centers Oo is positioned on the axis A2.

Since the position of the curvature center Oo with respect to the axis A2 is indicated on the TV monitor, the operator of the eccentricity measurement apparatus 500 adjusts the position of the aspherical lens L1 with respect to the lens holder 11B while viewing the TV monitor so that the adjustment sensor 37 receives the incident light on the predetermined reference area on the adjustment sensor 37. When it is visually confirmed on the TV monitor that the adjustment sensor 37 receives the incident light on the predetermined reference area on the adjustment sensor 37, the aspherical lens L1 is tightly fixed to the suction opening of the lens holder 11B by vacuum aspiration so that the position thereof with respect to the lens holder 11B does not change. This adjustment of the position of the aspherical lens L1 with respect to the lens holder 11B brings the curvature center Oo onto the axis A2.

Moreover, the operator of the eccentricity measurement apparatus 500 adjusts the position of the aspherical lens L1 with respect to the lens holder 11B while viewing the TV monitor so that the calculated amplitude of the swingable contact S1a becomes zero. This adjustment of the position of the aspherical lens L1 with respect to the lens holder 11B brings the curvature center Oz onto the axis A2.

It can be understood from the above descriptions that the aspherical-surface axis A1 of the aspherical surface r1 coincides with the axis A2 of the central holes 3a, 5a, 7a and 110a when both the curvature centers Oo and Oz are positioned on the axis A2.

Once the aspherical-surface axis A1 of the aspherical surface r1 coincides with the axis A2, the eccentricity of the aspherical surface r1 that is calculated by the processor 10 from the calculated amplitude of the swingable contact S3a of the third contact sensor S3 is visually checked on the TV monitor.

The procedure, performed using the eccentricity measuring apparatus 500, for measuring the eccentricity of the spherical surface r2 with the measurement phototransmitter 29 is the same as that in the third embodiment of the eccentricity measuring apparatus 300.

Figure 5:
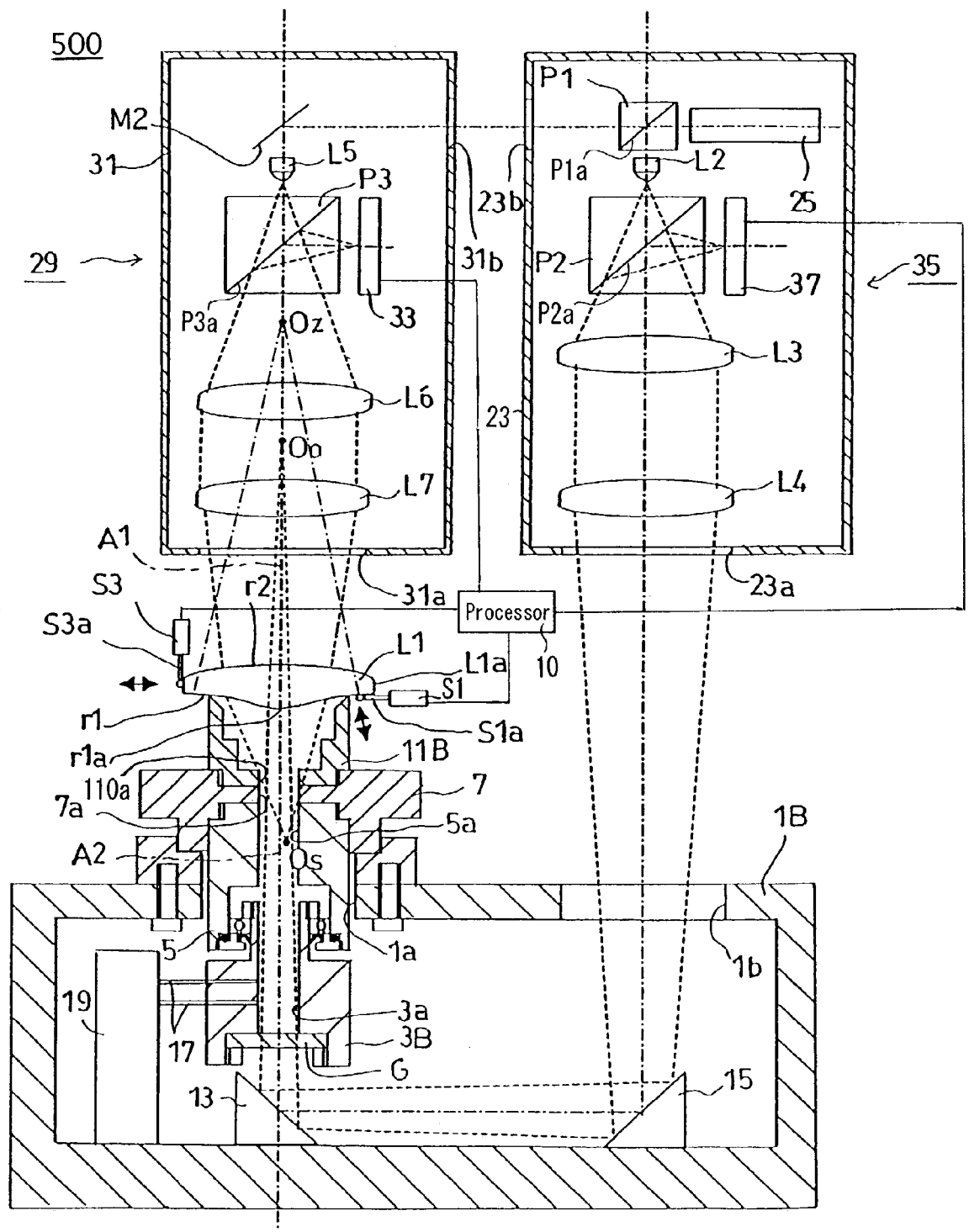
FIG. 5 is a cross sectional view of a fifth embodiment of the apparatus for measuring an eccentricity of an optical lens according to the present invention.

As can be understood from the above description, according to the fifth embodiment of the eccentricity measuring apparatus shown in FIG. 5, the eccentricity of the aspherical surface r1 and the eccentricity of the aspherical surface r2 can be measured easily.

The sixth embodiment of the apparatus for measuring an eccentricity of an optical lens according to the present invention will be hereinafter discussed with reference to FIG. 6. In the sixth embodiment of an eccentricity measuring apparatus 500, elements and parts similar to those in the fifth embodiment of the eccentricity measuring apparatus are designated by the same reference numerals, and will not be hereinafter discussed for the sake of simplicity.

The sixth embodiment of the eccentricity measuring apparatus 600 is used to measure the eccentricity of the aspherical surface r1 of the aspherical lens L8, to measure the eccentricity of the central portion of the aspherical surface r3 of the aspherical lens L8, and the degree of deviation of a peripheral portion of the aspherical surface r3.

The eccentricity measuring apparatus 600 is provided with the fourth contact sensor S4, which is identical to that used in the fourth embodiment of the eccentricity measuring apparatus 400.

The procedures, performed using the eccentricity measuring apparatus 600, for bringing the aspherical-surface axis A1 of the aspherical surface r1 into coincidence with the axis A2 of the central holes 3a, 5a, 7a and 110a with the first contact sensor S1 and the TV monitor, and for measuring the eccentricity of the aspherical surface r1 with the third contact sensor S3 and the TV monitor are the same as those in the fifth embodiment of the eccentricity measuring apparatus 500.

The procedures, performed using the eccentricity measuring apparatus 600, for measuring the eccentricity of the central portion of the aspherical surface r3 of the aspherical lens L8 with the measurement phototransmitter 29, and for measuring the degree of deviation of the peripheral portion of the aspherical surface r3 with the fourth contact sensor S4 and the TV monitor are the same as those in the fourth embodiment of the eccentricity measuring apparatus 400.

Figure 6:
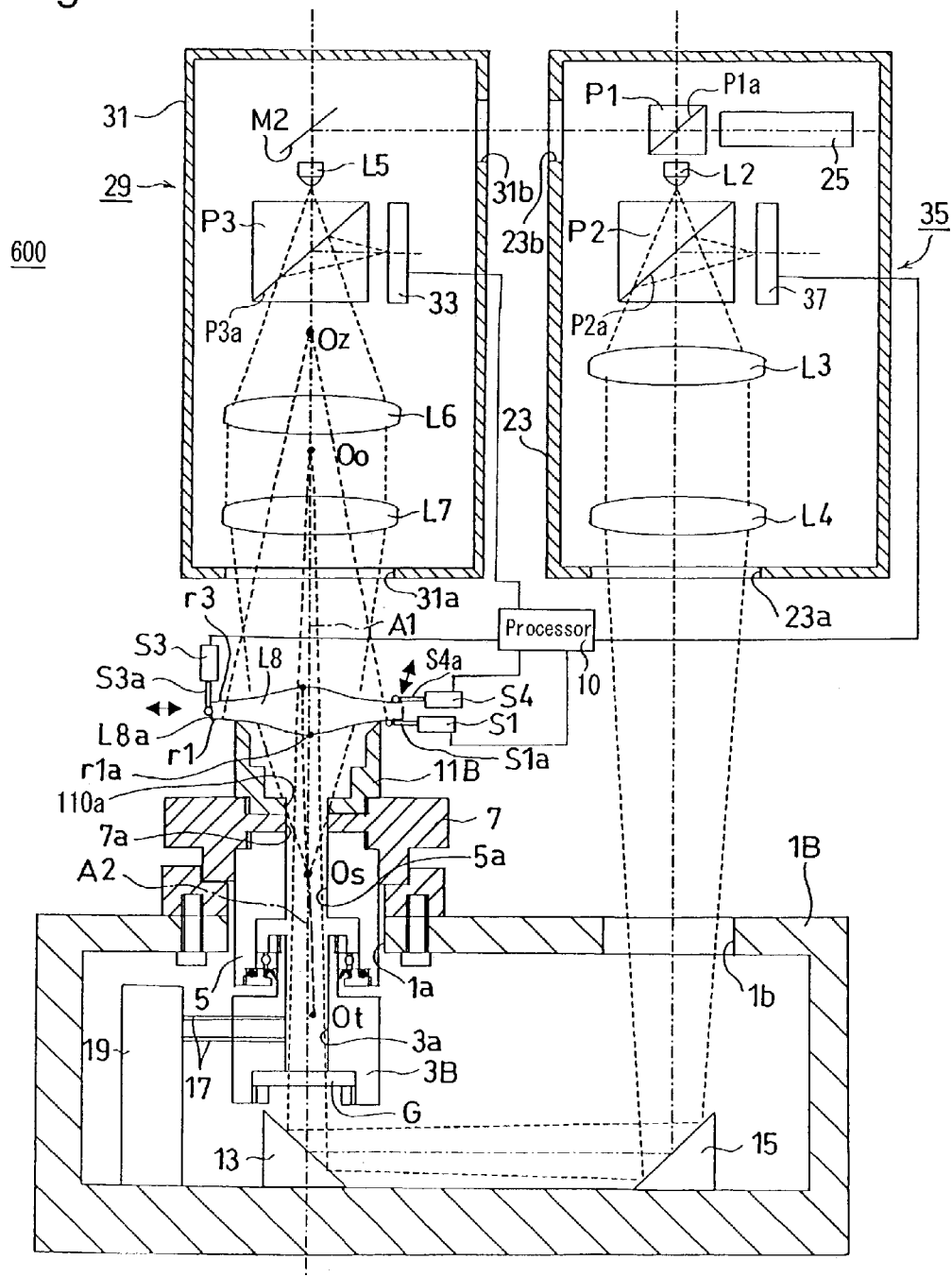
FIG. 6 is a cross sectional view of a sixth embodiment of the apparatus for measuring an eccentricity of an optical lens according to the present invention.

According to the sixth embodiment of the eccentricity measuring apparatus shown in FIG. 6, the eccentricity of the aspherical surface r1 of the aspherical lens L8, which has an aspherical surface on each side of the lens, the eccentricity of the central portion of the aspherical surface r3 of the aspherical lens L8 and the degree of deviation of the peripheral portion of the aspherical surface r3 can be measured easily.

The above described method and apparatus for measuring an eccentricity of an aspherical lens can be used most effectively when the degree of deviation of an aspherical surface from a paraxial spherical surface is so great that the eccentricity of the aspherical surface (eccentricity of the vertex of the aspherical surface with respect to the radial center of the aspherical lens) has a large effect on aberration of a lens system (not shown) in which the aspherical lens is incorporated.

Figure 4:
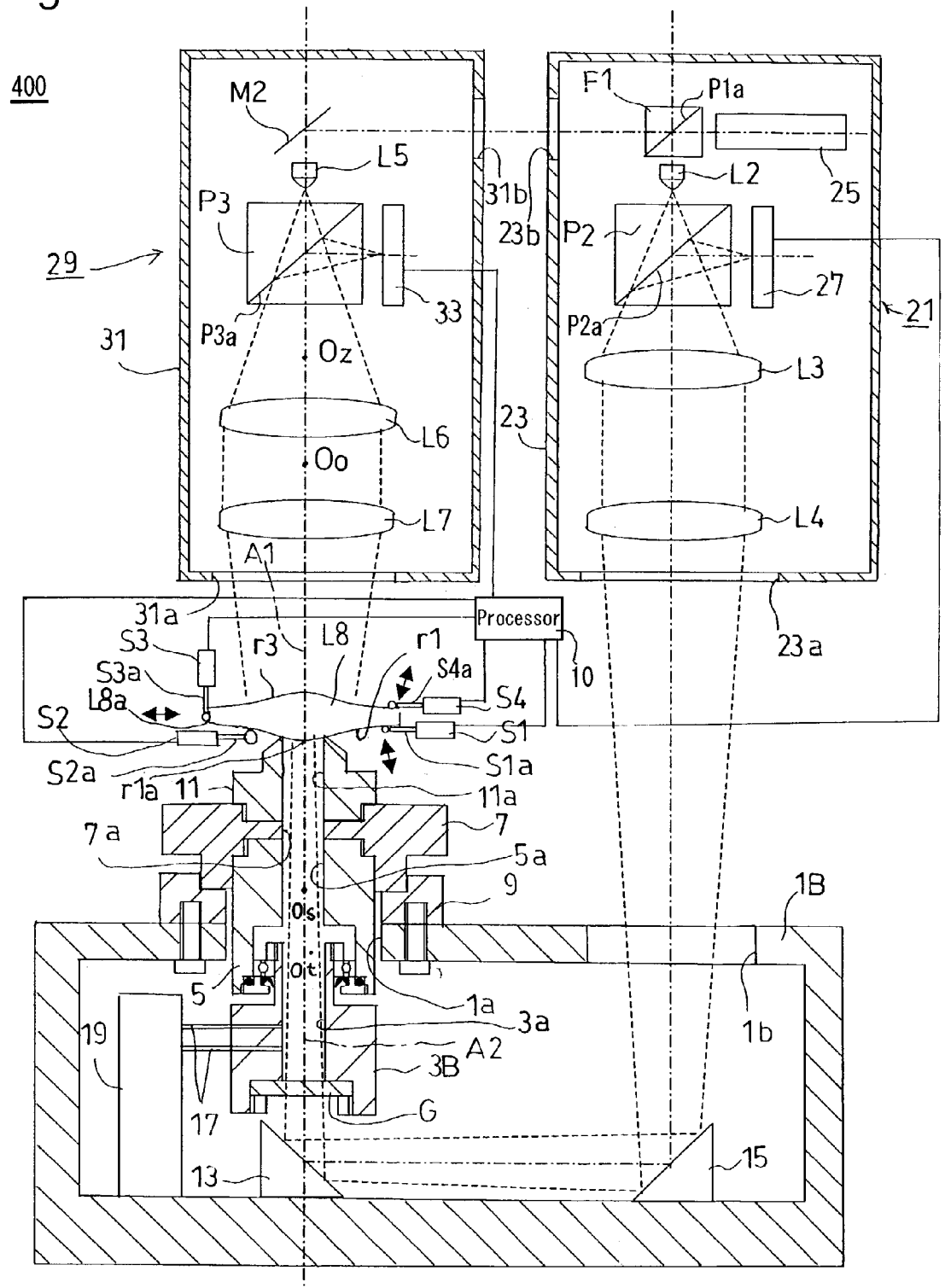
FIG. 4 is a cross sectional view of a fourth embodiment of the apparatus for measuring an eccentricity of an optical lens according to the present invention.

In the fourth embodiment of the eccentricity measuring apparatus shown in FIG. 4, the fourth contact sensor S4 can be replaced by a measurement phototransmitter (not shown) having the same structure as the measurement phototransmitter 29 which projects measuring light to be incident on a peripheral portion of the aspherical surface r3 of the aspherical lens L1 to measure the degree of deviation of a peripheral portion of the aspherical surface r3.

Each of the above described first through sixth embodiments can be used for a spherical lens (not shown) having a spherical surface on each side of the lens.

The first embodiment of an apparatus for centering and edging an optical lens according to the present invention will be hereinafter discussed with reference to FIG. 7. In this embodiment of the centering and edging apparatus, elements and parts similar to those in the first embodiment of the eccentricity measuring apparatus shown in FIG. 1 are designated by the same reference numerals, and will not be hereinafter discussed for the sake of simplicity.

Figure 7:
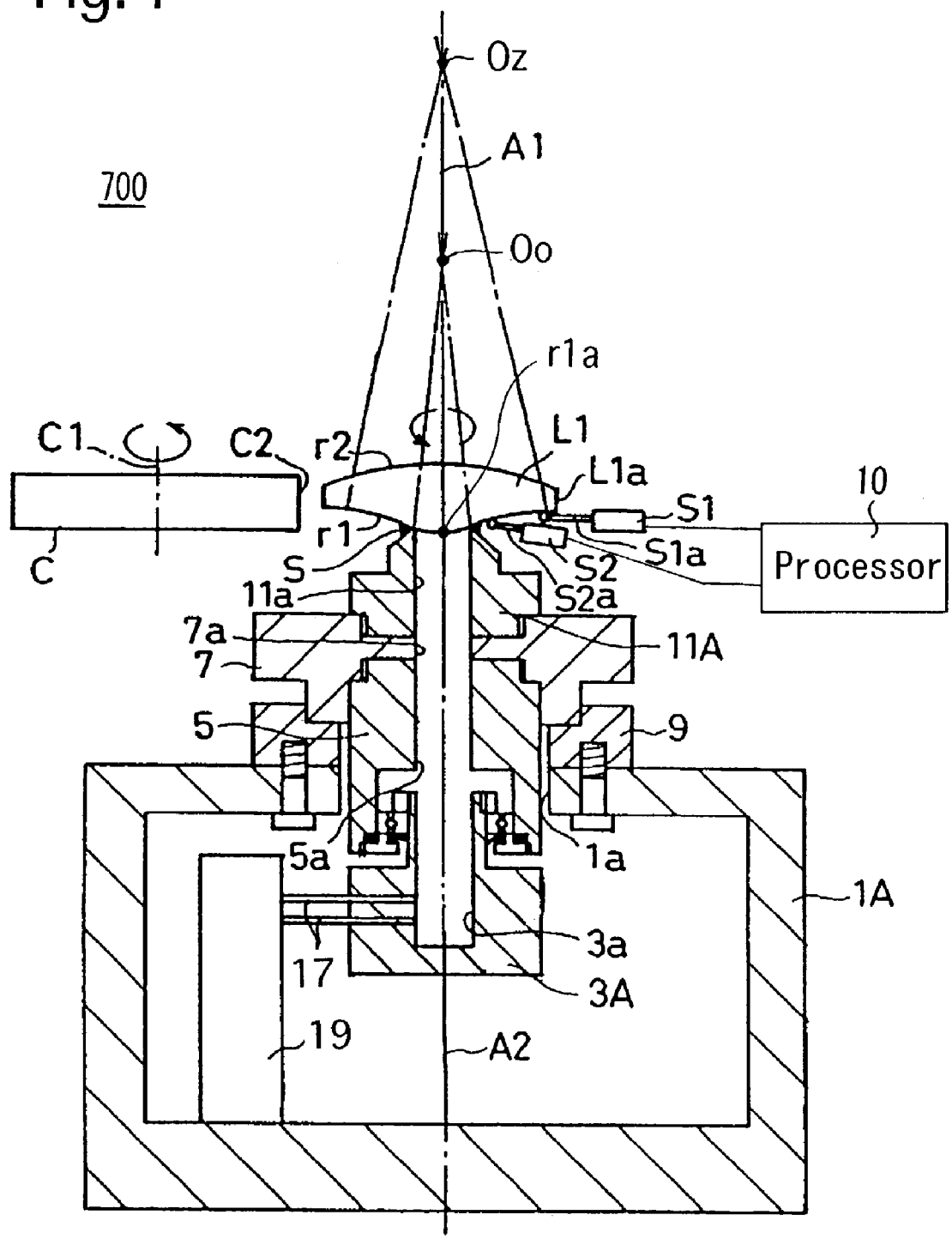
FIG. 7 is a cross sectional view of a first embodiment of an apparatus for centering and edging an optical lens according to the present invention.

The centering and edging apparatus 700 shown in FIG. 7 is used to center and edge the aspherical lens L1, which is provided on one and the other lens surfaces thereof with the aspherical surface r1 and the spherical surface r2, respectively, so that the eccentricity of the aspherical surface r1 becomes zero. Note that this state where the eccentricity of the aspherical surface r1 is zero means not only a state where the eccentricity of the aspherical surface r1 is exactly zero but also a state where the eccentricity of the aspherical surface r1 is substantially zero within a predetermined tolerance. The same can be said in each of the following second and third embodiments.

Firstly, the structure of the centering and edging apparatus 700 will be discussed hereinafter.

The basic structure of the centering and edging apparatus 700 is the same as that of the eccentricity measuring apparatus 100 shown in FIG. 1 except that the centering and edging apparatus 700 does not have the third contact sensor S3 shown in FIG. 1 of the third embodiment of the eccentricity measuring apparatus 300 and that the centering and edging apparatus 700 is provided, on one side (left side as viewed in FIG. 7) of the lens holder 11A slightly above the lens holder 11A, with a grinding wheel (grinding device) C. The grinding wheel C has a rotational axis C1 extending parallel to the axis A2 of the central holes 3a, 5a, 7a and 11a. When a switch (not shown) is OFF, the grinding wheel C remains in a stop position shown in FIG. 7 in which the grinding wheel C is disengaged from the aspherical lens L1. When the switch is turned ON, the grinding wheel C is driven to rotate about the axis C1 by a motor (not shown), and at the same time, the grinding wheel C is linearly moved by the motor toward the axis A1 to a contact position (not shown) in which a rim C2 of the grinding wheel C comes in contact with the rim L1a of the aspherical lens L1. Immediately after the switch is turned OFF, the grinding wheel C moves linearly back from the contact position to the stop position and stops rotating.

A method for centering and edging the aspherical lens L1 with the use of the centering and edging apparatus 700 will be discussed hereinafter.

Firstly, in a manner similar to that in the first embodiment of the eccentricity measuring apparatus 100, the position of the aspherical lens L1 with respect to the lens holder 11A is adjusted so that each of the calculated amplitudes of the swingable contacts S1a and S2a becomes zero to thereby bring each of the curvature centers Oo and Oz onto the axis A2. This makes the aspherical-surface axis A1 of the aspherical surface r1 coincident with the axis A2 of the central holes 3a, 5a, 7a and 11a.

Once the aspherical-surface axis A1 coincides with the axis A2, the aspherical lens L1 is bonded to the lens holder 11A by an adhesive (fixing device) S which is applied to the respective contacting portions between the aspherical surface r1 and the annular top end of the lens holder 11A.

After the aspherical lens L1 is firmly bonded to the lens holder 11A, the switch of the motor that is connected to the first rotatable member 5 is turned ON. This causes the grinding wheel C to rotate about the axis C1 while bringing the rim C2 of the grinding wheel C into contact with the rim L1a of the aspherical lens L1 to grind the entire surface of the rim L1a. After the entire surface of the rim L1a is ground by the grinding wheel C, the switch is turned OFF to move the grinding wheel C back to the stop position.

Upon the motor being turned OFF and the rotation of the lens holder 11A stops, the lens holder 11A together with the aspherical lens L1 is removed from the second rotatable member 7, and is soaked in a solvent (not shown) to remove the adhesive S from the aspherical lens L1 and the lens holder 11A. This disengages the aspherical lens L1 from the lens holder 11A. Alternatively, depending on the type of the adhesive S, the lens holder 11A together with the aspherical lens L1 may be heated to remove the adhesive S from the aspherical lens L1 and the lens holder 11A.

If the entire surface of the rim L1a is ground in the above described manner, the radial center of the aspherical lens L1 is positioned on the aspherical-surface axis A1 of the aspherical surface r1, so that the eccentricity of the aspherical surface r1 is reduced to zero. The aspherical lens L1 the rim L1a of which has been ground in this manner does not have any adverse effect on aberration of a lens system (now shown) in which the aspherical lens L1 is incorporated even if the aspherical lens L1 is installed in the vicinity of a diaphragm in the lens system.

The second embodiment of the apparatus for centering and edging an optical lens according to the present invention will be hereinafter discussed with reference to FIG. 8. In this embodiment of the centering and edging apparatus, except for a mirror M1 replacing the prism P1, elements and parts similar to those in the fifth embodiment of the eccentricity measuring apparatus shown in FIG. 5 or in the first embodiment of the centering and edging apparatus shown in FIG. 7 are designated by the same reference numerals, and will not be hereinafter discussed for the sake of simplicity.

An aspherical lens (optical lens) L9 which is to be centered and edged by the centering and edging apparatus 800 is provided on one and the other surfaces thereof with the aspherical surface r1 and the spherical surface r2, respectively. More specifically, the curvature center of the spherical surface r2 is not positioned on the aspherical-surface axis A1 of the aspherical surface r1 while a rim L9a of the aspherical lens L9 does not have a constant thickness so that the shape of the rim is seen as a wedge shape as viewed in a radial direction of the aspherical lens L9.

The centering and edging apparatus 800 is used to center and edge the aspherical lens L9 having such a shape so that the eccentricity of the aspherical surface r1 is reduced to zero.

The basic structure of the centering and edging apparatus 800 is the same as that of the eccentricity measuring apparatus 500 shown in FIG. 5 except that the centering and edging apparatus 800 does not have either the measurement phototransmitter 29 or the third contact sensor S3 of the fifth embodiment of the eccentricity measuring apparatus 500, and that the centering and edging apparatus 800 is provided with the grinding wheel C like that of the centering and edging apparatus 700.

In the second embodiment of the centering and edging apparatus 800, the aspherical lens L9 is put on the top of the lens holder 11B with the aspherical surface r1 covering the suction opening of the lens holder 11B, the position of the aspherical lens L9 with respect to the lens holder 11B is adjusted to make the aspherical-surface axis A1 of the aspherical surface r1 coincident with the axis A2 of the central holes 3a, 5a, 7a and 110a with the use of the adjustment phototransmitter 35, and the entire surface of the rim L9a is ground by the grinding wheel C after the aspherical lens L9 is bonded to the lens holder 11B by the adhesive S.

Accordingly, the aspherical lens L9 can be centered and edged by the centering and edging apparatus 800 so that the eccentricity of the aspherical surface r1 is reduced to zero by grinding the entire surface of the rim L9a with the aspherical-surface axis A1 coincident with the axis A2 even though the aspherical lens L9 does not have a typical lens shape.

The third embodiment of the apparatus for centering and edging an optical lens according to the present invention will be hereinafter discussed with reference to FIG. 9. In this embodiment of the centering and edging apparatus, elements and parts similar to those in the fifth embodiment of the eccentricity measuring apparatus shown in FIG. 5 or in the first embodiment of the centering and edging apparatus shown in FIG. 7 are designated by the same reference numerals, and will not be hereinafter discussed for the sake of simplicity.

The centering and edging apparatus 900 is used to center and edge the aspherical lens L9 so that the eccentricity of the aspherical surface r1 is zero, and is also used to measure the eccentricity of the spherical surface r2 of the aspherical lens L1 (i.e., the eccentricity of the curvature center Os of the spherical surface r2 with respect to the aspherical-surface axis A1 of the aspherical surface r1).

The basic structure of the centering and edging apparatus 900 is the same as that of the eccentricity measuring apparatus 500 shown in FIG. 5 except that the centering and edging apparatus 900 does not have the third contact sensor S3 of the fifth embodiment of the eccentricity measuring apparatus 500 and that the centering and edging apparatus 900 is provided with the grinding wheel C of the centering and edging apparatuses 700 and 800. Accordingly, the aspherical lens L9 can be centered and edged by the centering and edging apparatus 900 so that the eccentricity of the aspherical surface r1 becomes zero in a manner similar to that in the second embodiment of the centering and edging apparatus 800. In addition, the eccentricity of the spherical surface r2 of the aspherical lens L1 can be measured in a manner similar to that in the fifth embodiment of the eccentricity measuring apparatus 500.

Figure 10:
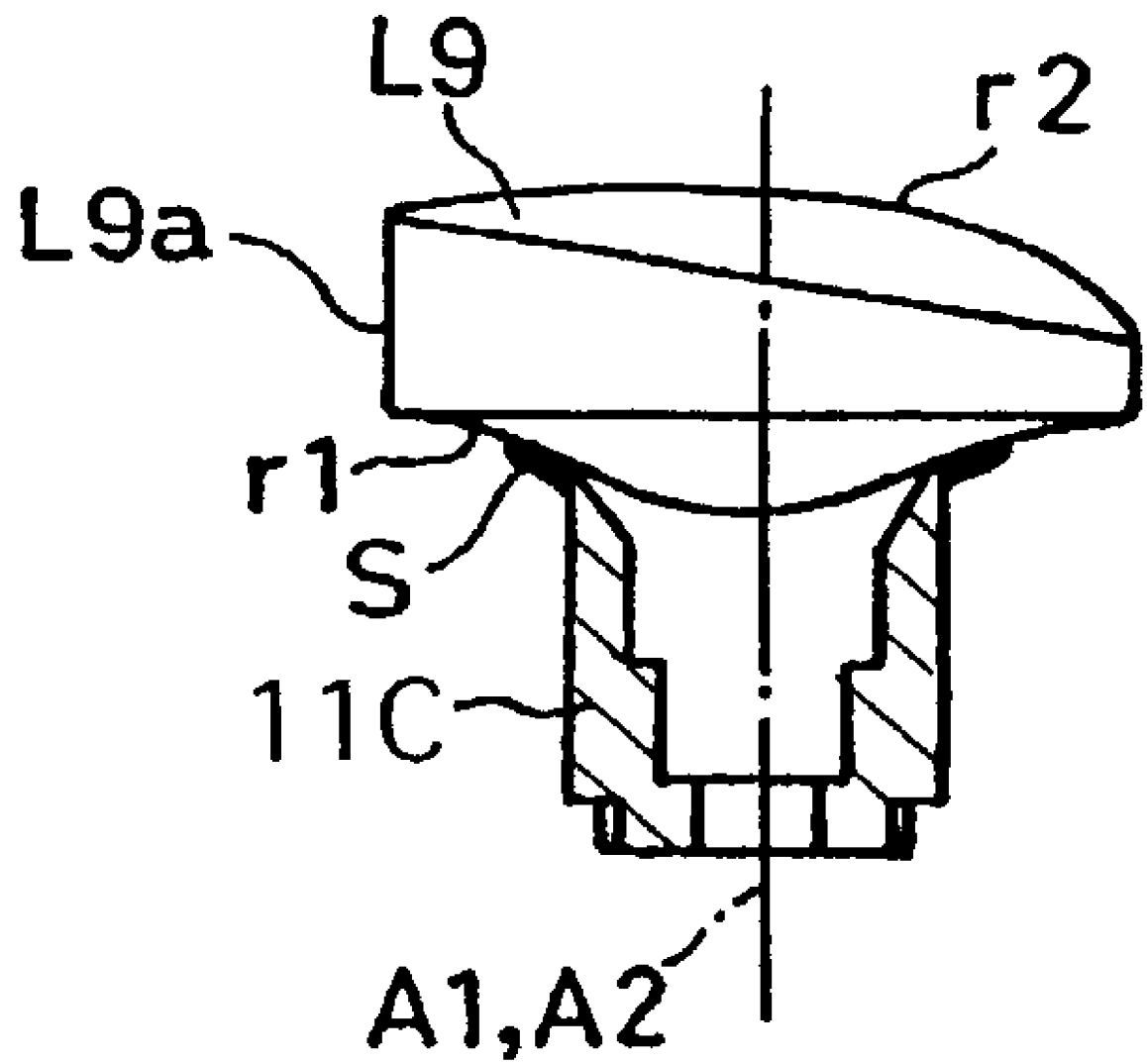
FIG. 10 shows an alternate embodiment of a lens holder of the centering and edging apparatus of the second and third embodiments shown in FIGS. 8 and 9.

FIG. 10 shows a lens holder 11C which can be replaced by the lens holder 11B used in each of the second and third embodiments of the centering and edging apparatus 800 and 900. The lens holder 11C is smaller than the lens holder 11B in diameter. With the lens holder 11C, the aspherical-surface axis A1 of the aspherical surface r1 can be adjusted to be coincident with the axis A2 of the central holes 3a, 5a, 7a and 110a with the first and second contact sensors S1 and S2, the swingable contacts S1a and S2a of which come in contact with a central portion and a peripheral portion of the aspherical surface r1, respectively.

Figure 8:
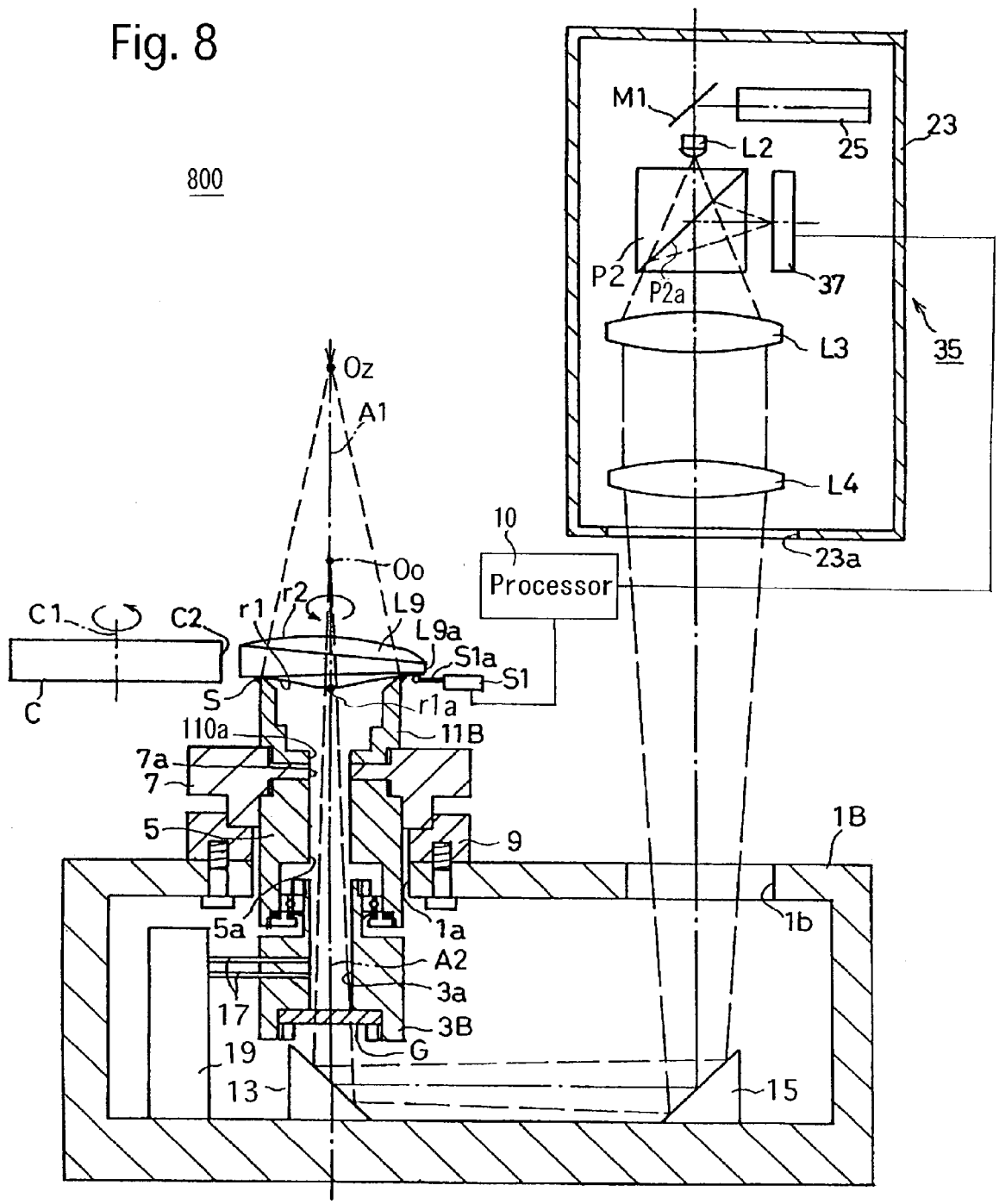
FIG. 8 is a cross sectional view of a second embodiment of the apparatus for centering and edging an optical lens according to the present invention.
Figure 9:
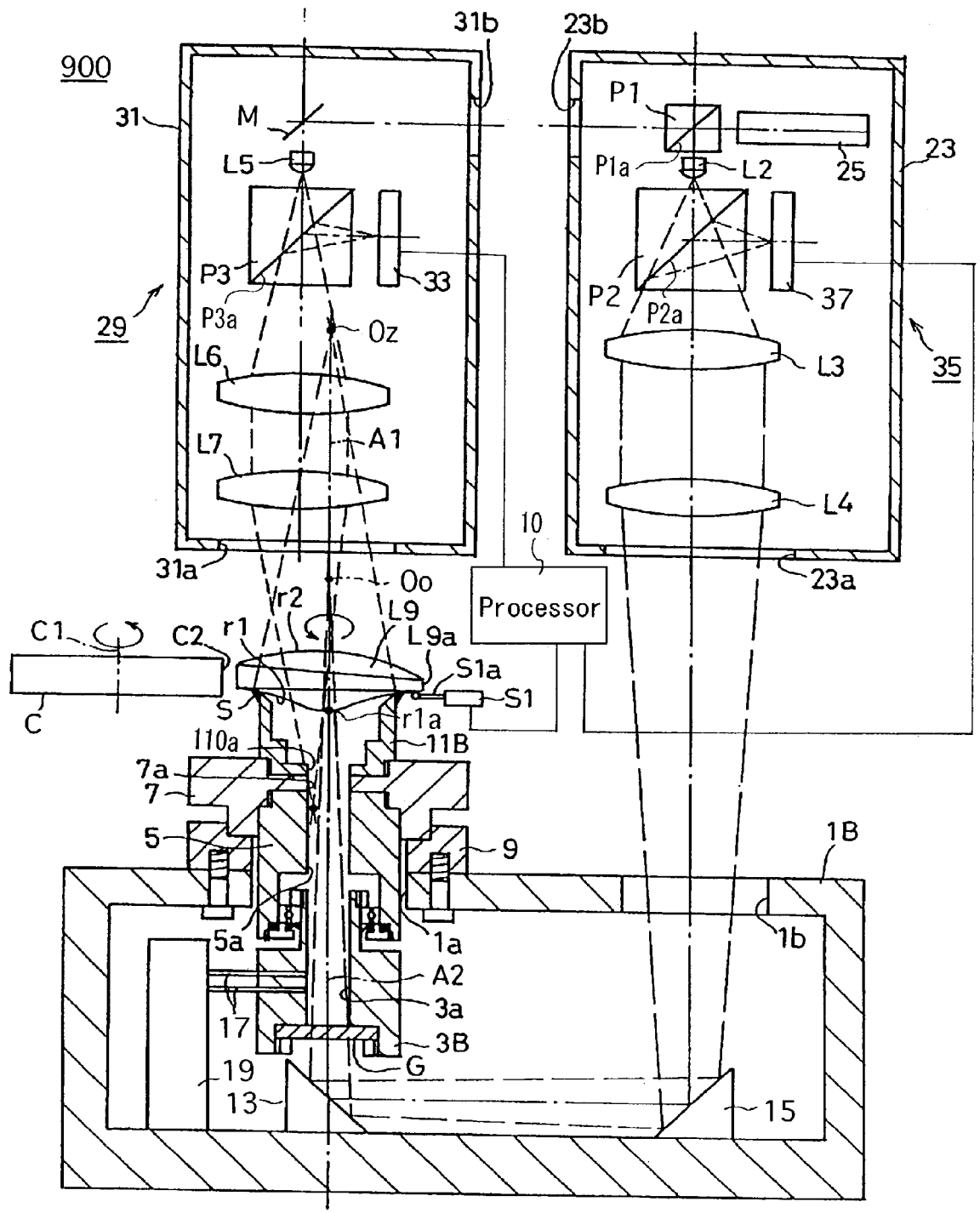
FIG. 9 is a cross sectional view of a third embodiment of the apparatus for centering and edging an optical lens according to the present invention.

The aspherical lens L9 shown in FIGS. 8 and 9 can be replaced by a tilted aspherical lens (not shown) having an aspherical surface on each of both lens surfaces. The term "tilted aspherical lens" herein means an aspherical lens which is designed so that the optical axes of both aspherical lens surfaces are inclined to each other and so that the shape of the rim of the lens is seen as a wedge shape as viewed in a radial direction of the lens. In this case, it is possible to measure the degree of deviation of a peripheral portion of the other aspherical surface (i.e., the aspherical surface on the opposite side of the aspherical lens L1 from the aspherical surface r1) by making the swingable contact S4a of the fourth contact sensor S4 come into contact with the other aspherical surface, and to further measure the eccentricity of a central portion of the other aspherical surface by projecting measuring light to be incident on the other aspherical surface in a manner similar to that shown in FIG. 9.

Furthermore, it is of course possible to carry out centering and edging on an optical lens (not shown) having spherical surfaces on both sides.

In each of the first through third embodiments of the centering and edging apparatuses 700, 800 and 900, the eccentricity of the aspherical surface r1 may not become zero due to error, such as mechanical error, even if the entire surface of the rim of the aspherical lens is ground by the grinding wheel C. However, an adverse effect exerted on aberration of a lens system (now shown) in which the aspherical lens is incorporated can be reduced if the eccentricity of the aspherical surface r1 is reduced smaller than that before the aspherical lens is ground.

In each of the second, third, fourth and sixth embodiments shown in FIGS. 2, 3, 4 and 6, the apparatus for centering and edging an optical lens which has a different structure from each of the first through third embodiments shown in FIGS. 7 through 9 can be obtained by replacing the third contact sensor S3 with the grinding wheel C.

Moreover, in this modified embodiment of the centering and edging apparatus or each of the first through third embodiments of the centering and edging apparatuses shown in FIGS. 7 through 9, the first contact sensor S1 can be replaced by an adjustment phototransmitter (not shown), having the same structure as the adjustment phototransmitter 35, to bring the curvature center Oz of the peripheral portion of the aspherical surface r1 onto the axis A2 with an adjustment sensor corresponding to the adjustment sensor 37 which is incorporated in the adjustment phototransmitter.

As can be understood from the foregoing, according to the present invention, an eccentricity of the vertex of an aspherical surface of an aspherical lens with respect to the radial center of the aspherical lens, an eccentricity of the curvature center of the other lens surface, and the degree of deviation of the other lens surface can be measured in a higher degree of precision. Moreover, an optical lens, at least one lens surface of which is formed as an aspherical surface, can be centered and edged so that an eccentricity of the vertex of an aspherical surface of the optical lens with respect to the true aspherical-surface axis of the aspherical lens surface of the optical lens reduces even if the optical lens is a tilted aspherical lens.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An apparatus for measuring eccentricity of an optical lens, comprising:
   a rotary lens holder which rotates about a rotational axis thereof while supporting a first lens surface of an optical lens by vacuum aspiration;
   a first determining device that determines whether a curvature center of a central portion of said first lens surface is positioned on said rotational axis of said rotary lens holder;
   a second determining device that determines whether a curvature center of a peripheral portion of said first lens surface is positioned on said rotational axis of said rotary lens holder; and
   an eccentricity detection device which detects an eccentricity of said optical lens with respect to said rotational axis of said rotary lens holder to calculate an eccentricity of a vertex of said first lens surface with respect to the radial center of said optical lens, said eccentricity detection device including a detector having a contact which comes in contact with a rim of said optical lens to detect said eccentricity of said optical lens with respect to said rotational axis of said rotary lens holder.

2. The eccentricity measuring apparatus according to claim 1, wherein said detection of said eccentricity of said optical lens, with said contact of said eccentricity detection device in contact with said rim of said optical lens, is performed upon achieving a state wherein said first determining device determines that said curvature center of said central portion of said first lens surface is positioned on said rotational axis of said rotary lens holder and upon achieving a state wherein said second determining device determines that said curvature center of said peripheral portion of said first lens surface is positioned on said rotational axis of said rotary lens holder.

3. The eccentricity measuring apparatus according to claim 1, wherein said second determining device comprises a second detector that detects the degree of deviation of said peripheral portion of said first lens surface with respect to said rotational axis of said rotary lens holder, said second detector including a second contact which comes in contact with said peripheral portion of said first lens surface to detect said degree of deviation of said peripheral portion of said first lens surface.

4. The eccentricity measuring apparatus according to claim 1, wherein said first determining device comprises: an adjustment phototransmitter which projects light to be incident on said central portion of said first lens surface; and
   a first light-receiving and determining device which receives incident light thereon, said incident light being projected from said adjustment phototransmitter to be vertically incident on said central portion of said first lens surface and vertically reflected by said central portion of said first lens surface, to determine whether said curvature center of said central portion of said first lens surface is positioned on said rotational axis of said rotary lens holder from an incident position of said received incident light on a light receiving surface of said first light-receiving and determining device.

5. The eccentricity measuring apparatus according to claim 1, wherein said second determining device comprises:
   a deviation detector that detects the degree of deviation of said central portion of said first lens surface with respect to said rotational axis of said rotary lens holder, said deviation detector including a contact which comes in contact with said central portion of said first lens surface to detect said degree of deviation of said central portion of said first lens surface;
   a confirmation phototransmitter which projects light to be incident on said central portion of said first lens surface; and
   a light-receiving and determining device which receives incident light thereon, which is projected from said confirmation phototransmitter to be vertically incident on said central portion of said first lens surface to be vertically reflected by said central portion of said first lens surface, to determine whether said curvature center of said central portion of said first lens surface is positioned on said rotational axis of said rotary lens holder from an incident position of said received incident light on a light receiving surface of said light-receiving and determining device.

6. The eccentricity measuring apparatus according to claim 1, further comprising:
   a measurement phototransmitter which projects light to be incident on a second lens surface of said optical lens;
   a light-receiving device which receives incident light thereon that is projected from said measurement phototransmitter to be vertically incident on said second lens surface to be vertically reflected by said second lens surface, wherein said light-receiving device can sense an incident position of said received incident light on a light receiving surface of said light-receiving device; and
   a processor that determines whether said curvature center of said second lens surface is positioned on said rotational axis of said rotary lens holder from an incident position of said incident light received by said light-receiving device on said light receiving surface thereof to measure an eccentricity of said curvature center of said second lens surface with respect to said rotational axis of said rotary lens holder.

7. The eccentricity measuring apparatus according to claim 1, further comprising:
   a measurement phototransmitter which projects light to be incident on a central portion of a second lens surface of said optical lens;
   a light-receiving device which receives incident light thereon that is projected from said measurement phototransmitter to be firstly vertically incident on a central portion of said second lens surface and to be subsequently vertically reflected by said central portion of said second lens surface to be incident on said light-receiving device, wherein said light-receiving device can sense an incident position of said received incident light on a light receiving surface of said light-receiving device;
   a processor that determines whether said curvature center of said central portion of said second lens surface is positioned on said rotational axis of said rotary lens holder from an incident position of said incident light received by said light-receiving device on said light receiving surface thereof to measure an eccentricity of said curvature center of said second lens surface with respect to said rotational axis of said rotary lens holder; and
   a fourth detector that detects the degree of deviation of a peripheral portion of said second lens surface with respect to said rotational axis of said rotary lens holder, said fourth detector comprising a fourth contact which comes in contact with said peripheral portion of said second lens surface to detect said degree of deviation of said peripheral portion of said second lens surface.

8. A method for measuring eccentricity of an optical lens with an eccentricity detection device, comprising:
- rotating an optical lens, having a first lens surface and a second lens surface, about a rotational axis of a rotary lens holder while supporting said first lens surface by vacuum aspiration;
- determining whether a curvature center of a central portion of said first lens surface is positioned on said rotational axis of said rotary lens holder;
- determining whether a curvature center of a peripheral portion of said first lens surface is positioned on said rotational axis of said rotary lens holder;
- adjusting a position of said optical lens with respect to said rotary lens holder so that said curvature center of said central portion and said curvature center of said peripheral portion are positioned on said rotational axis of said rotary lens holder; and
- detecting an eccentricity of said optical lens with respect to said rotational axis of said rotary lens holder, in state wherein said curvature centers of said central portion and said peripheral portion of said first lens surface are positioned on said rotational axis of said rotary lens holder, to calculate an eccentricity of a vertex of said first lens surface with respect to the radial center of said optical lens, said eccentricity detection device including a contact which comes in contact with a rim of said optical lens to detect said eccentricity of said optical lens with respect to said rotational axis of said rotary lens holder.

9. The eccentricity measuring method according to claim 8, wherein determining whether a curvature center of a peripheral portion of said first lens surface is positioned on said rotational axis of said rotary lens holder comprises making a first contact sensor come in contact with said peripheral portion of said first lens surface to detect an amount of deviation of said peripheral portion of said first lens surface.

10. The eccentricity measuring method according to claim 8, wherein determining whether a curvature center of a central portion of said first lens surface is positioned on said rotational axis of said rotary lens holder comprises making a contact sensor come in contact with said central portion of said first lens surface to detect an amount of deviation of said central portion of said first lens surface.

11. The eccentricity measuring method according to claim 10, wherein determining whether a curvature center of a central portion of said first lens surface is positioned on said rotational axis of said rotary lens holder comprises:
- making a second detector come in contact with said central portion of said first lens surface to detect said degree of deviation of said central portion of said first lens surface; and
- after adjusting the position of said optical lens with respect to said rotary lens holder, making a first light-receiving and determining device receive incident light which is projected from a phototransmitter to be vertically incident on said central portion of said first lens surface to be vertically reflected by said central portion of said first lens surface, said first light-receiving and determining device determining whether said curvature center of said central portion of said first lens surface is positioned on said rotational axis of said rotary lens holder from an incident position of said received incident light on a light receiving surface of said first light-receiving and determining device.

12. The eccentricity measuring method according to claim 8, wherein determining whether a curvature center of a central portion of said first lens surface is positioned on said rotational axis of said rotary lens holder comprises:
- projecting light to be incident on said central portion of said first lens surface; and
- making a first light-receiving and determining device receive the incident light which is projected to be vertically incident on said central portion of said first lens surface to be vertically reflected by said central portion of said first lens surface, said first light-receiving and determining device determining whether said curvature center of said central portion of said first lens surface is positioned on said rotational axis of said rotary lens holder from an incident position of said received incident light on a light receiving surface of said first light-receiving and determining device.

13. The eccentricity measuring method according to claim 8, further comprising:
- projecting light to be vertically incident on a second lens surface of said optical lens after adjusting the position of said optical lens with respect to said rotary lens holder;
- receiving incident light which is vertically reflected by said second lens surface; and
- determining an eccentricity of said curvature center of said second lens surface with respect to said rotational axis of said rotary lens holder.

14. The eccentricity measuring method according to claim 8, further comprising:
- projecting light to be vertically incident on a central portion of said second lens surface of said optical lens after adjusting the position of said optical lens with respect to said rotary lens holder;
- receiving incident light which is vertically reflected by said central portion of said second lens surface; and
- determining an eccentricity of said curvature center of said central portion of said second lens surface with respect to said rotational axis of said rotary lens holder.

15. The eccentricity measuring method according to claim 8, wherein at least said first lens surface of said optical lens, which is supported by said rotary lens holder, is formed as an aspherical surface.

16. An apparatus for measuring eccentricity of an optical lens, comprising:
- a rotary lens holder which rotates about a rotational axis and supports a first lens surface of an optical lens by vacuum aspiration so that an aspherical-surface axis of said optical lens substantially coincides with said rotational axis;
- a first contact sensor which comes in contact with a central portion of said first lens surface;
- a second contact sensor which comes in contact with a peripheral portion of said first lens surface;
- a third contact sensor which comes in contact with a rim of said optical lens; and
- a processor that determines whether a curvature center of said central portion of said first lens surface is positioned on said rotational axis from a signal output from said first contact sensor, determines whether a curvature center of said peripheral portion of said first lens surface is positioned on said rotational axis from a signal output from said second contact sensor, and determines an eccentricity of said rim of said optical lens with respect to said rotational axis of said rotary lens holder from a signal output from said third contact sensor to calculate an eccentricity of a vertex of said first lens surface with respect to the radial center of said optical lens.

17. A method for measuring eccentricity of an optical lens, comprising:

rotating a lens holder which supports an optical lens about a rotational axis, said lens holder supporting a first lens surface of said optical lens by vacuum aspiration so that an aspherical-surface axis of said optical lens substantially coincides with said rotational axis;

making a first contact sensor come in contact with a central portion of said first lens surface;

making a second contact sensor come in contact with a peripheral portion of said first lens surface;

making a third contact sensor come in contact with a rim of said optical lens;

determining whether a curvature center of said central portion of said first lens surface is positioned on said rotational axis from a signal output from said first contact sensor;

determining whether a curvature center of said peripheral portion of said first lens surface is positioned on said rotational axis from a signal output from said second contact sensor; and determining an eccentricity of said rim of said optical lens with respect to said rotational axis of said rotary lens holder from a signal output from said third contact sensor to calculate an eccentricity of a vertex of said first lens surface with respect to the radial center of said optical lens.

* * * * *